US008365254B2

(12) United States Patent
Burke et al.

(10) Patent No.: US 8,365,254 B2
(45) Date of Patent: Jan. 29, 2013

(54) UNIFIED AUTHORIZATION FOR HETEROGENEOUS APPLICATIONS

(75) Inventors: Jonah S. Burke, Seattle, WA (US); Arshish C. Kapadia, Issaquah, WA (US)

(73) Assignee: Microsoft Corporation, Redmond, CA (US)

( * ) Notice: Subject to any disclaimer, the term of this patent is extended or adjusted under 35 U.S.C. 154(b) by 1955 days.

(21) Appl. No.: 11/262,273

(22) Filed: Oct. 28, 2005

(65) Prior Publication Data

US 2006/0294578 A1 Dec. 28, 2006

Related U.S. Application Data

(63) Continuation-in-part of application No. 11/191,771, filed on Jul. 28, 2005, which is a continuation-in-part of application No. 11/165,748, filed on Jun. 23, 2005, now abandoned.

(51) Int. Cl.
*H04L 29/06* (2006.01)
(52) U.S. Cl. .................................. 726/4; 726/21; 726/27
(58) Field of Classification Search .............. 726/2, 3–7, 726/12, 17–19; 713/153–158, 189; 707/781–785; 709/203, 219, 229
See application file for complete search history.

(56) References Cited

U.S. PATENT DOCUMENTS

| 4,817,140 | A | 3/1989 | Chandra et al. |
| 6,101,607 | A | 8/2000 | Bachand et al. |
| 6,230,171 | B1 | 5/2001 | Pacifici et al. |
| 6,279,030 | B1 | 8/2001 | Britton et al. |
| 6,438,549 | B1 * | 8/2002 | Aldred et al. ........................ 1/1 |
| 6,438,580 | B1 | 8/2002 | Mears et al. |
| 6,625,603 | B1 * | 9/2003 | Garg et al. ........................... 1/1 |
| 6,685,090 | B2 | 2/2004 | Nishigaya et al. |
| 6,772,216 | B1 | 8/2004 | Ankireddipally et al. |
| 6,785,822 | B1 | 8/2004 | Sadhwani-Tully |
| 6,900,819 | B2 | 5/2005 | Marshall et al. |
| 6,915,265 | B1 | 7/2005 | Johnson |
| 6,917,944 | B1 | 7/2005 | Prasad et al. |
| 7,124,111 | B1 | 10/2006 | Jemella et al. |
| 7,647,304 | B2 | 1/2010 | Burke et al. |
| 7,810,106 | B2 | 10/2010 | Kapadia et al. |
| 2002/0068573 | A1 | 6/2002 | Raverdy et al. |
| 2002/0091757 | A1 * | 7/2002 | Cuomo et al. ................ 709/203 |
| 2002/0138479 | A1 | 9/2002 | Bates et al. |
| 2002/0147706 | A1 | 10/2002 | Burnett |

(Continued)

FOREIGN PATENT DOCUMENTS

| WO | WO 99/01802 | 1/1999 |
| WO | WO 01/33468 A1 | 5/2001 |
| WO | WO 03/030020 A2 | 4/2003 |

OTHER PUBLICATIONS

Microsoft TechNet, Microsoft Office Information Bridge Framework 1.0 Planning and Architecture Guide, Chapter 3—Planning, Jul. 29, 2004.

(Continued)

*Primary Examiner* — Gilberto Barron, Jr.
*Assistant Examiner* — Virginia T Ho

(57) ABSTRACT

An enterprise system may separate the executable functionality existing in backend applications, and the separation may be at differing levels of granularity. The separated functions of the application may be registered in a catalog in the form of metadata objects. Once the executable functionality has been registered, the authorization information for each granular functional object may be associated with authorization information. In this manner, the authorization of a service of an application may be made on a feature by feature (or object by object) basis in a unified manner.

22 Claims, 14 Drawing Sheets

U.S. PATENT DOCUMENTS

| | | | |
|---|---|---|---|
| 2002/0152210 A1* | 10/2002 | Johnson et al. | 707/9 |
| 2003/0018632 A1 | 1/2003 | Bays et al. | |
| 2003/0144858 A1 | 7/2003 | Jain et al. | |
| 2003/0144892 A1 | 7/2003 | Cowan et al. | |
| 2003/0182452 A1 | 9/2003 | Upton | |
| 2003/0208493 A1 | 11/2003 | Hall et al. | |
| 2003/0218628 A1 | 11/2003 | Deshpande et al. | |
| 2003/0229623 A1* | 12/2003 | Chang et al. | 707/3 |
| 2004/0044866 A1 | 3/2004 | Casazza | |
| 2005/0015619 A1 | 1/2005 | Lee | |
| 2005/0091182 A1 | 4/2005 | Chen et al. | |
| 2005/0228803 A1 | 10/2005 | Farmer et al. | |
| 2006/0136990 A1* | 6/2006 | Hinton et al. | 726/2 |
| 2006/0149657 A1 | 7/2006 | Weild | |
| 2007/0061296 A1 | 3/2007 | Burke et al. | |

OTHER PUBLICATIONS

Journee Enterprise Data Hub, http://www.journee.com/prod_index.html.

Enterprise Application Integration, www.eastidge.net, retrieved as Google's text-only cache of http://www.eastridge.net/neweast_net/fusebox.asp?fbL=eai&fbSL=6 on Jan. 23, 2005.

International Search Report for PCT/US 06/23564 mailed Feb. 22, 2007. 8 Pages.

C.C. Burt, B.R. Bryant, R.R. Raje, A. Olson, M. Auguston, "Model Driven Security: Unification of Authorization Models for Fine-Grain Access Control", EDOC'03.

S.P. Miller, B.C. Neuman, J.I. Schiller, J.H. Saltzer, "Kerberos Authentication and Authorization System", Section E.2.1, Oct. 27, 1998.

P. Samarati, E. Bertino, S. Jajodia, "An Authorization Model for a Distributed Hypertext System", IEEE Transactions on Knowledge and Data Engineering, Aug. 1996, pp. 555-562, vol. 8, Issue 4.

K. Keahey, V. Welch, "Fine-Grain Authorization for Resources Management in the Grid Environment", 2002.

PCT International Search Report; PCT/US2006/034975; dated Feb. 26, 2007.

* cited by examiner

200

201

| System identifier 202 | System descriptor 206 | | User Identifier 250 | Rights 252 |
|---|---|---|---|---|
| System instance identifier 203 | Connection information 204 | System identifier 202 | User Identifier 250 | Rights 252 |
| Entity identifier 212 | System identifier 202 | Entity type descriptor 216 | User Identifier 250 | Rights 252 |
| Method identifier 222 | Entity identifier 212 | Parameter list 226 | User Identifier 250 | Rights 252 |
| Parameter identifier 232 | Parameter descriptor 234 | Method identifier 222 | User Identifier 250 | Rights 252 |
| Parameter type identifier 242 | Tag 244 | Parameter identifier 232 | Default value 248 | User Identifier 250 | Rights 252 |

*FIG. 2*

UNIFIED AUTHORIZATION FOR HETEROGENEOUS APPLICATIONS

CROSS-REFERENCE TO RELATED APPLICATION(S)

This application claims priority to and is a Continuation-In-Part application under 35 U.S.C. §120 of U.S. patent application Ser. No. 11/191,771, filed Jul. 28, 2005, which is a Continuation-In-Part application under 35 U.S.C. §120 of U.S. application Ser. No. 11/165,748, filed Jun. 23, 2005, which are both incorporated by reference herein.

BACKGROUND

Organizations may use many applications, such as general purpose data centric applications using persistent data, within a computing environment to carry out daily operations. For example, multiple types of line of business (LOB) systems (e.g., business critical database application) may be implemented along with development applications, 'home-grown' applications, and the like. However, access to each of these heterogeneous applications by one or more users may require interactions with different information, in different formats, in different languages and/or semantics, with different log-on and authorization methods, with different connection requirements, with separate operational threads for each user on each application, and the like.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

To unify the user's experience with the multiple applications, a data store service system may be implemented which acts as an intermediary between the user and the multiple applications to provide a simple and unified interface for the user and to generate the complex and specific interactions with the individual services of the multiple applications available for access. The parent application, U.S. patent application Ser. No. 11/191,771, filed Jul. 28, 2005, describes a data store service system which exposes disparate or heterogeneous data store related services to the user without requiring the user to have application specific knowledge of how to interact with the specified service. To provide the unified interaction to the user, the data store system may maintain with a metadata store information such as service interaction details, e.g., available services, description of services, data types, how to access specific data, how to communicate semantically with a service to access the desired data, and the like. The data store service system may provide an application program interface which receives a user request for access to a service, access the associated metadata, and using the metadata, convert the user's simple, universal, unified and/or common request to a communication appropriate for the service.

Generally, to allow prefabrication and pooling of connections to an application and avoid pass through of individual user information, an application may be accessed within the context of a 'super-user', e.g., an account that has access to all available data which may be for performance reasons. In this manner, one or more (e.g., x) 'super-user' connections may be held open simultaneously (which may be done in advance to actual user log-on) to service one or more (x) unique end users simultaneously with the x connections without requiring closure and re-establishment of the connection for each user request. However, implementing a super-user account is in conflict with individual security. Specifically, if all data is accessed effectively anonymously, e.g., all requests to the application come from the 'super-user' account, then it is not possible to trim which user accesses which data based on personal permissions. To reduce this problem, many applications provide their own authorization modules which allow administrators to specify who has access to what data stored in the system. However, this requires talking to the application as a specific end user, and not a super-user. This solution precludes the performance gains achieved by a super-user account. For example, the communications of authorization information for each user may need to be secured and the authorization request pass-through increases the amount and time of communication with the service. In addition, since each requesting user is individually authorized, each request for a service may run on a separate processing thread, which may over-burden a service and the available communication connections. Also, each application has its own model, which requires separate authorization for each different application for each user, requiring multiple sets of credentials and/or accounts to be set up and maintained for each user, which increases the personal and administrative management of the environment. Moreover, each application or service may expose a particular granularity to the information. For example, a SQL application may only expose access to information at the table level, but not at higher or lower levels (described further below). Similarly, access for services of some applications may be provided in a global sense, e.g., any right is a global right to access any part of the services of the application. This may limit the granularity of access allowed for an identified user.

As a result of the scalable account access and security goals, prior art application environments may 'turn off' the individual application's security model, and write custom code 'in front' of the application. This home-grown code may be responsible for cataloging the data in the specific application and mapping out the permissions for each user. In this manner, end users may interact with the intermediate layer which checks permissions, and if permissions are available, the custom code impersonates the super-user and calls the application service and forwards the data retrieved back to the end user. Although this achieves scalability and security, it is at the expense of custom coding, which is created by hand, at the intermediate layer for each back end system. Moreover, the custom coding must be accomplished individually for each different back-end application, despite similarities in desire individual permissions, and the like.

The custom coding requires intimate knowledge of the data stored in the back end system and of the APIs to be used to make calls against the system. For example, each application may have its own unique authorization model and store its permissions granted to users in its own way. Moreover, each application may identify its sets of users in a different manner. For example, a system based on Microsoft's Active Directory may identify a person as Redmond/person and another system based on open source LDAP Directory may identify the same person as O=Redmond; CN=person. Thus, there may be no way to tell that these users are the same user. Administrators must then learn various authorization models and permissions which are scattered across many applications. Additionally, authorization of each user must be repeated for every application accessed by the user, since each application may have its own authorization technique and or credentials. In this manner, the custom coding required may increase maintenance of the software, cost, time to market, and the like.

Since the data store service system of the parent application accesses the service as a middle tier, authorization of a requesting user may be difficult due to the maintenance cost, time to market, etc. of the custom code cataloging the data services of each back-end application and mapping the user permission. To extend the unified interaction for the user, reduce the user's need for understanding the details of the semantics of an underlying application, expose a user defined granularity to the services of an application, reduce administration costs, and/or for any other advantage, the data store service system may authorize a user based upon the services requested by the user and authorization information associated with the requesting user. The authorization information may be stored in the metadata data store, such as by associating a requested service, data type served up by a service, individual methods on a data type of a service, specific sub-components of the return values of a method of a data type of a server, object instantiation of any of the above, and the like with a user identifier of an authorized user and/or with one or more rights or allowed actions of the authorized user. A separate (higher privilege) right may be used to control the set of people that can set/change rights (similar to an administered right) on any object. In some cases, security features of a parent object may be propagated down to child objects automatically, upon request, or in any other determined manner. The security features may be surfaced by injecting access check calls for various rights at key methods on the securable objects. If the user is authorized, the data store service system may access the service through a single super-user account using data store service system authorization credentials through the service in accordance with the determined authorization and allowed rights.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 2 is a table of an example metadata store suitable for use with the enterprise environment of FIG. 1;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a enterprise environment with multiple line of business applications accessible through a network connection, the enterprise environment described is provided as an example and not a limitation and it is to be appreciated that any number and types of services may be provided in any number and/or combination of the features described further below.

Figure 1:
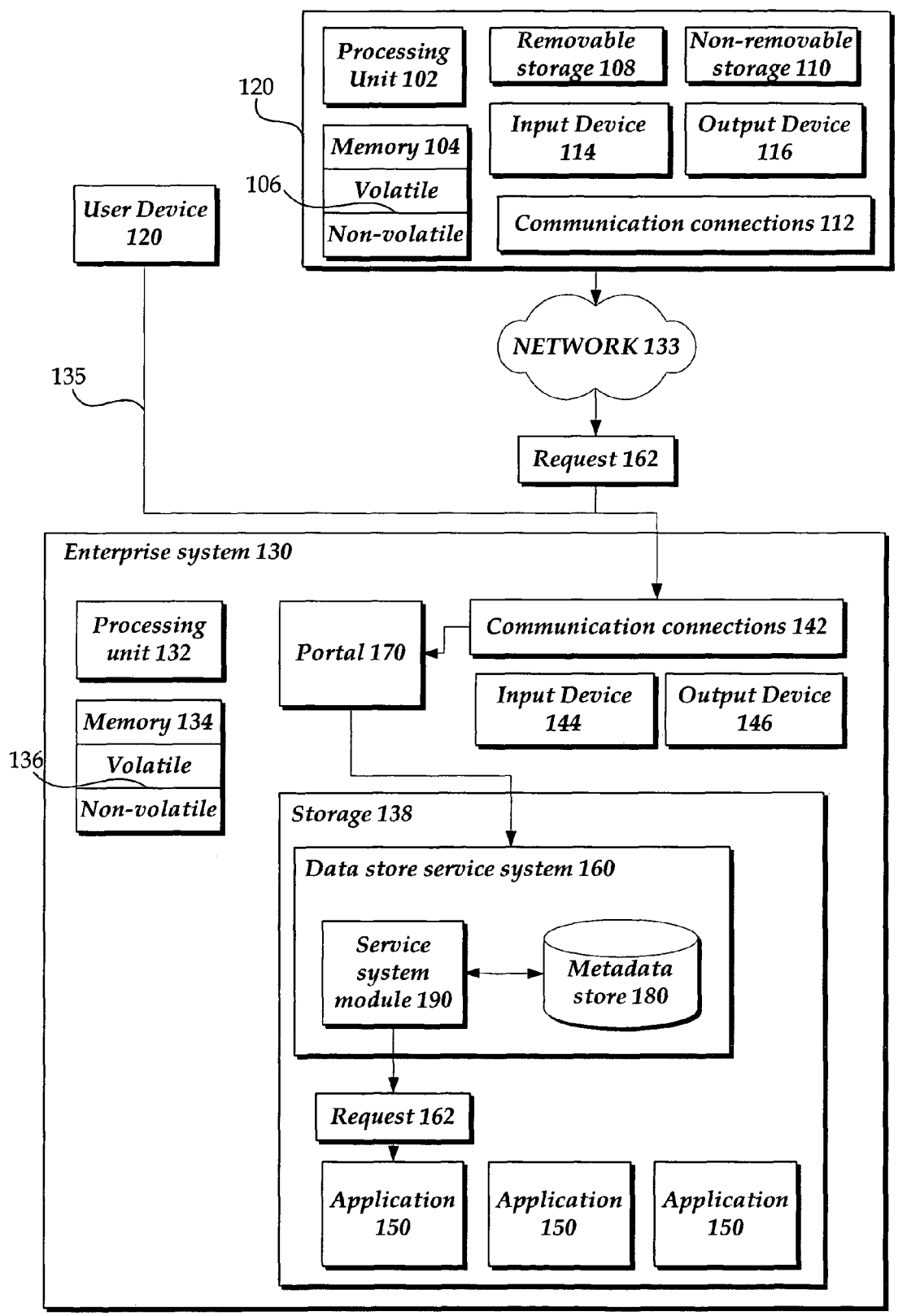
FIG. 1 is a schematic diagram of an example enterprise environment suitable for implementing a data store service system.

FIG. 1 and the following discussion are intended to provide a brief, general description of a data store service system within an enterprise environment. As shown in FIG. 1, one or more user devices 120 may connect to the enterprise system 130 through a network 133, represented by a cloud, may be directly connected to the enterprise system through a connection 135, may be a part of the enterprise system, or access the enterprise system in any suitable manner.

Network 133 may include many well-known components, such as routers, gateways, hubs, and the like and allows the user device 120 to communicate via wired and/or wireless media. Network 133 may comprise a Wide Area Network (WAN), such as the Internet, a local area network (LAN), although a variety of other communication systems and/or methods using appropriate protocols may be used, including other types of WANs, LANs, wireless networks, phone lines, serial and/or parallel cables, coaxial cables, and any combination thereof.

Each user device 120 may provide a suitable computing environment to provide access to services available from the enterprise system 130. User device 120 and the enterprise system 130 of FIG. 1 and the following discussion are intended to provide a brief, general description of a suitable computing environment in which all or a portion of a data store service system may be implemented.

The operating environment of the user device 120 and the enterprise system 130 of FIG. 1 are only one example of a suitable operating environment and is not intended to suggest any limitation as to the scope of use or functionality of the operating environment. Other well known computing systems, environments, and/or configurations that may be suitable for use with a user interface editing application described herein include, but are not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

With reference to FIG. 1, an exemplary system for implementing user access to the enterprise system 130 includes a computing device, such as user computing device 120. In its most basic configuration, computing device 120 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by line 106. Additionally, device 120 may also have additional features and/or functionality. For example, device 120 may also include additional storage (e.g., removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules, or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 120. Any such computer storage media may be part of device 120.

Device 120 may also contain communication connection(s) 112 that allow the device 120 to communicate with other devices, such as with other computing devices through network 133. Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes both storage media and communication media.

Device 120 may also have input device(s) 114 such as keyboard, mouse, pen, voice input device, touch input device, laser range finder, infra-red cameras, video input devices, and/or any other input device. Output device(s) 116 such as one or more displays, speakers, printers, and/or any other output device may also be included.

In one example, the user device may use communication connection 112 to access the enterprise system 130 through the network 133 to request one or more services of the multiple enterprise applications 150 supported by the enterprise system. To support the multiple enterprise applications 150, the enterprise system 130 may be a computing device similar to or different from that described above with reference to the user device 120.

As shown in FIG. 1, the enterprise system 130 may provide a suitable computing environment to provide the services available from the enterprise applications 150. Although not required, the data store service system 160 and other components of the enterprise system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

With reference to FIG. 1, an exemplary system for providing the services from the enterprise applications 150 of the enterprise system 130 includes a computing device, such as computing device 130. In its most basic configuration, computing device 130 typically includes at least one processing unit 132 and memory 134. Depending on the exact configuration and type of computing device, memory 134 may be volatile (such as RAM), non-volatile (such as ROM, flash memory, etc.) or some combination of the two. This most basic configuration is illustrated in FIG. 1 by line 136. Additionally, device 130 may also have additional features and/or functionality. For example, device 130 may also include additional storage (e.g., removable and/or non-removable) including, but not limited to, magnetic or optical disks or tape. Such additional storage is illustrated in FIG. 1 by storage 138. Device 130 may also contain communication connection(s) 142 that allow the device 130 to communicate with other devices, such as with other computing devices through network 133.

Device 130 may also have input device(s) 144 such as keyboard, mouse, pen, voice input device, touch input device, laser range finder, infra-red cameras, video input devices, and/or any other input device. Output device(s) 146 such as one or more displays, speakers, printers, and/or any other output device may also be included.

Those skilled in the art will realize that storage devices utilized to store program instructions can be distributed across a network. For example a remote computer may store an example of the process described as software. A local or terminal computer may access the remote computer, which may be through the enterprise system 103, and download a part or all of the software to run the program. Alternatively, the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

A user device 120 may interact with the enterprise system 130 to access one or more services of the multiple applications 150, which may reside in memory 134, in storage 138, or may be remotely accessed by the enterprise system 130 such as through a communication connection. Although FIG. 1 illustrates the service applications 150 as resident in the memory 150 of the enterprise system 130, it is to be appreciated that one or more of the applications 150 may reside in separate memories and/or separate computing devices which may be accessible through a connection such as through a communication connection.

The applications 150 may provide any suitable services to the user device 120. Example applications may include enterprise applications such as line of business systems such as those provided by SAP or SIEBEL. Other examples may include 'home-grown' applications of the enterprise, Internet services such as World Wide Web sites, and the like.

The interaction with the enterprise system may be through a portal 170, shown in FIG. 1. The portal may act as an entryway into the enterprise system, and/or may facilitate interactions with the enterprise system. One example of a suitable portal may include the SharePoint System™ available from Microsoft Corp. of Redmond, Wash. In response to user requests through the portal 170, the processor 132 may access and/or execute one or more applications 150 to allow a user device 120 to access data or execute methods which may be stored in the enterprise system, such as in memory 134 or storage 138 or remotely accessed by the data store service system 160.

A user device 120 may directly execute the desired application to access a desired service. However, as shown in FIG. 1, the enterprise system 130 may provide a data store service system 160 as an interface between a user device 120 and the one or more applications 150. In this manner, the data store service system may unify the user's experience with the multiple applications 150 by acting as an intermediary between the user and the multiple applications to provide a simple and unified interface for the user and to generate the complex and specific interactions with the individual services of the multiple applications available for access.

Any suitable data store service system 160 may be provided. One suitable data store service system is described further in U.S. patent Ser. No. 11/191,771 filed Jul. 28, 2005, and is described briefly here for clarity. To provide the unified interaction to the user, the data store service system 160 may include a service system module 190 to maintain service interaction details with a metadata store 180. The data store service system 160 may provide an application program interface which receives a user request 162 for access to a service, accesses the associated metadata store 180, and using the metadata, converts the user's simple (and possibly unified) request 162 to a communication 164 appropriate for the specific requested service of the applications 150.

The metadata store 180 may provide an indication of available applications, available services, description of services, data types, how to access specific data, how to communicate semantically with a service to access the desired data, and the like.

The available applications, services, data, and the like may be represented as objects of a particular type. For example, a request to access a system object may represent a request to access the application associated in the metadata store. The application, such as one of applications 150 may be represented as a collection of computational logic that is implemented using persistent and/or transient data. In another example, a request to access an entity object may represent a request to access a collection of related fields or data and method or logic definitions, which may be through services of one or more of the applications 150. In another example, a request to access a method object may represent a request to access data associated with an application program interface, or any other suitable methods. In another example, a request to access a parameter may represent a request to access a single field or data which is associated with a method or system. In another example, a request to access a type descriptor object may represent a request to access all data of a particular type, such as all data of a particular type or column in column delimited information associated with a particular system.

One example of a metadata store 180 is shown in the table 200 of FIG. 2. In the metadata store, an object indicator representing available services to a user may be associated with identifying information and any other information which may be used by the service system module 190 to convert the unified simple request 162 from the user to a complex call 164 in the format required by the application 150.

As shown in FIG. 2, the metadata store 180 may associate a system identifier 202 with one or more of a system descriptor 206, and/or any other suitable information. The system identifier 202 may be any suitable identifier of the desired system. A system may be an entire application of the applications 150, or may be a particular service or function of the one or more applications 150. The system descriptor 206 may be any suitable description of the type and/or general function, purpose or name of the associated application in the applications 150. For example, the system identifier may be a unique identifier associated with a system descriptor identifying a type of LOB or other application, such as SAP, Siebel, and the like.

As shown in the FIG. 2, the metadata store 180 may associate a system instance identifier 203 with one or more of connection information 204, a system identifier 202, and any other suitable information. A system identified by the system identifier may be instantiated when the connection information 204 is associated with the system instantiation identifier 203 and the system identifier 202. It is to be appreciated that a single system, e.g., SAP identified by a single system identifier, may have multiple instances across the enterprise system, e.g., multiple versions accessible through different connection or the same system accessible through different connections. In this manner, each system identifier may be associated with zero or more system instantiation identifiers. The connection information 204 may be any suitable connection information which allows the data store service system to communicate and/or interact with the associated system instance such as network location, host server name, port number, data store service system credentials, information regarding how to connect to the system, and the like. The data store service system credentials may include authentication and/or authorization for the data store service system to access the associated system. As used herein, authentication means identification of the requesting device or user and authorization means verifying that the requesting user or device has permission or rights to access the requested service. An indication or description of the instantiation may be included in the connection information and/or the system descriptor.

As shown in the table 200 of FIG. 2, the metadata store 180 may associate an entity identifier 212 with one or more of an entity type descriptor 216, a system identifier 202, and the like. The entity identifier 212 may be any suitable identifier which indicates a particular collection of related fields or data and/or method or logic definitions available in the associated system identified by the system identifier 202. In this manner, each system identifier 202 may be associated with zero or more entity identifiers 212. For example, an SAP system may have one or more associated entity identifiers indicating customer entities, order entities, product entities, and the like. The method identifier may be any suitable identifier indicating a set of logic or instructions of a system which may be executed to retrieve the desired data. The entity type descriptor 216 may be any suitable indication of the data or fields of data which will be retrieved if the associated method is executed. An instance of an entity is an actual set of values for each field in the entity definition, which may be obtained by executing one of the methods defined in the entity object.

As shown in the table 200 of FIG. 2, the metadata store 180 may associate a method identifier 222 with one or more of an entity identifier 212, a parameter list 226, and the like. In this manner, metadata about a system's application program interface may be called a method. The entity identifier 212 may represent the associated entity that may use the identified method to retrieve particular information. In this manner, each entity identifier 212 may be associated with zero or more method identifiers 222. The method identifier 222 may be any suitable identifier indicating a set of logic or instructions which may be executed as part of one of the applications 150 to access and/or manipulate the indicated entity. The method identifier may indicate the type of method, such as read, write, update, delete, and the like. For example, a customer entity in an SAP system may provide one or more of a create customer method, a view customer method, and the like. The parameter list 216 may be any suitable parameter list in any suitable format that indicates the parameters and/or their required structures and/or formats that may be needed to invoke the identified method. For example, the parameter list may include one or more identifiers of parameter objects and/or definitions of format and type of parameter required. However, it is to be appreciated that the parameter object itself may provide a definition of the format and/or type of parameter required.

A single system API may be used with different semantics within the enterprise system. For example, the same API can be used to find many instances of an entity (such as by using wildcard as an input) as well as to find a specific instance of an entity. To conserve cache space within the metadata store, the concept of a method instance may be introduced as a representation of an association between a method and a set of default values for each of the parameters of a method. Thus, invoking two method instances that are associated with the same method may yield two entirely different results.

As shown in table 200 of FIG. 2, the metadata store 180 may associate a parameter identifier 232 with one or more of a parameter descriptor 234, a method identifier 222, and the like. The method identifier 222 may indicate the one or more method identifiers which may use that parameter object during invocation of the method. In this manner, each method identifier 222 may be associated with zero or more parameter identifiers 232. The parameter identifier 232 may be any suitable identifier identifying the associated parameter. The parameter descriptor 234 may be any suitable information describing the associated parameter, such as an indication of a parameter type (e.g., string, integer, real, and the like), parameter format, and the like.

As shown in table 200 of FIG. 2, the metadata store 180 may associate a parameter type identifier 242 with one or more of a tag 244, a parameter identifier 232, a default value 248, and the like. The parameter type identifier 242 may be any suitable identifier identifying the associated parameter type. In one example, the parameter type identifier may indicate the type of value that the parameter may take, such as string, integer, real, and the like. In another example, the parameter type indicator may indicate the type of data associated with the parameter value, such as cost, individual's name, product code, contact information, and the like. It is to be appreciated that any suitable set of parameter types may be used in accordance with the environment and applications. For example, one or more parameter type identifiers 242 may be associated with another parameter type identifier 242 and/or may be associated with a single parameter identifier 232. In this manner, a parameter type identifier 242 and its associated data may represent a filed on a complex parameter. The tag 244 may be any suitable indicator of a type or other characteristic of the parameter type, such a whether the associated parameter type is an identifier, a filter, and the like. The parameter identifier 246 may indicate the parameter identifiers, e.g., one or more of parameter identifier(s) 232, having that parameter type. The default value 248 may be any suitable default or null value indicating a default value of the parameter associated with the parameter type if no value is stored or indicated. For example, the default value may be a strict value, and/or may indicate the format of the value of the parameter.

Although FIG. 2 illustrates the metadata store 180 of FIG. 1 as a single table 200, it is to be appreciated that any suitable data store in any suitable format may be used to store and/or communicate the metadata store, and the like, including one or more of a relational database, object-oriented database, unstructured database, an in-memory database, or other data store. A storage array may be constructed using a flat file system such as ASCII text, a binary file, data transmitted across a communication network, or any other file system. Notwithstanding these possible implementations of the foregoing data stores, the term data store and storage array as used herein refer to any data that is collected and stored in any manner accessible by a computing device.

It should be appreciated that the entry items and manner in which table 200 is organized in FIG. 2 are provided for ease of illustration and descriptive purposes only, as the particular data items provided and the manner they are organized may vary depending on the particular environment and language in which they are employed. In one example, the metadata store may be implemented as an XML file containing serialized metadata object definitions. Each application may have one or more systems, with each system containing one or more other hierarchical objects, e.g., entity, method, parameter, parameter type, and the like.

By populating the metadata store 180, one or more applications 150 may be registered with the enterprise system 130, e.g., a system object may be instantiated within the metadata store and associated with one or more lower hierarchical objects as appropriate, such as entities, methods, parameters, and the like. In this manner, a user may provide the service system module 190 of FIG. 1 a simple request (e.g., request 162) for access to a service. By referencing the objects and their associated metadata in the metadata store 180, the service system module 190 may convert the unified request 162 into a complex and application specific request 164 in the appropriate format without the user being required to have detailed knowledge of the format, language, and semantics of individual and often heterogeneous applications providing available services to users.

Since the data store service system 160 may convert user requests 162 into formatted and semantically correct requests 164 and interacts with the applications 150, the applications 150 may authenticate and/or authorize the data store service system, such as through the data store service system credentials of the connection information 204 stored in the metadata store 180. However, even if the data store service system 160 is authenticated and authorized, this does not mean that the requesting user 120 is also authorized to access the service. As noted above, transmitting the user's identity and individual credentials through to the application may have drawbacks. Moreover, maintaining a user's identity in a multi-tier system across multiple computers can be technically challenging. Thus, the service system 160 may determine the appropriate authorization of the requesting user, before accessing the services of the associated application 150. In this manner, a unified interaction for user authorization may be provided across multiple heterogeneous applications, which may reduce the need to manage multiple user accounts for each application, and to manage multiple user credentials for each user for each application.

To authorize a user's access to a requested service, the data store service system 160 may provide an authorization module (not shown) or the authorization services may be a part of the functions of the service system module 190, as shown in FIG. 1. More particularly, the service system module may verify that the identified user device has the appropriate rights to the requested service. The authorization information may be stored in the metadata data store 180, such as by associating an object identifier of a service with one or more of user identifiers and/or with one or more rights or allowed actions of the authorized user.

As shown in the table 200 of FIG. 2, the metadata data store 180 may associate an object identifier (such as system identifier 202, entity identifier 212, method identifier 222, parameter identifier 232, parameter type identifier 242, and the like) with one or more of a user identifier 250, one or more rights 252 or allowed actions of the identified user, and the like. The user identifiers 250 may list all user identifiers or only those user identifiers having associated rights in the associated service. If the user identifiers include only those user identifiers having positive rights (e.g., rights to access a service of the object), the user identifier 250 and associated rights 252 may be referred to as an access control list (ACL). In this manner, each securable object in the metadata store may have an associated ACL with each ACL comprising one or more access control entries (ACEs) which is a data structure or record of a user identifier with its associated set of rights detailing what the associated user can do.

The user identifier may be any suitable user identifier such as user context descriptor indicating one or more of an individual, a group, a device, a connection, role, software application, time of request, location of the user device, and the like. In a simple example, the user identifier may be an individual's account with the portal 170. In a more complex example, the user identifier may be a combination of a user account with the portal through a specific connection (which may have a required security level), within a specified range of time of day (e.g., working hours). In this manner, access to services may be controlled with a granularity that may be more fine-grained than that available by any one or more of the underlying back-end applications 150.

Each user identifier in the ACE may have an associated one or more right indicators 252 which indicate the action(s), power(s), and/or privilege(s) that are allowed by the indicated user. The right indicator 252 may be any suitable indicator of rights associated with the object. For example, the rights associated with an object include one or more of viewing the object (e.g., viewing data stored in a back end system that is represented by the object which may be performed by executing the object to get the data back), editing the object, enabling or disabling features of the object, setting permissions of the object (e.g., modify the associated ACL), executing the object (e.g., if the object is a method), showing a copy of the object, and the like. In some cases, the lack of a positive right listed in the ACE may indicate that the right is not provided to the indicated user identifier. In other cases, negative rights may be included in the ACE, such as NOT editing the object. This latter example may be useful if an object has a default set of rights given to all users unless otherwise specified in an associated ACL.

It is to be appreciated that an object, such as a method and the like, may not have an associated ACL. The data store service system 160 may interpret the lack of an associated ACL in any suitable manner. For example, no ACL may indicate that all users may have all or a predetermined or default set of rights, which may be appropriate in the case of a filter object. In another example, no associated ACL may indicate the no users have any rights. However, it is to be appreciated that some default rights may be instantiated automatically for each object, such as the right to modify the object itself in the metadata store.

Figure 3:
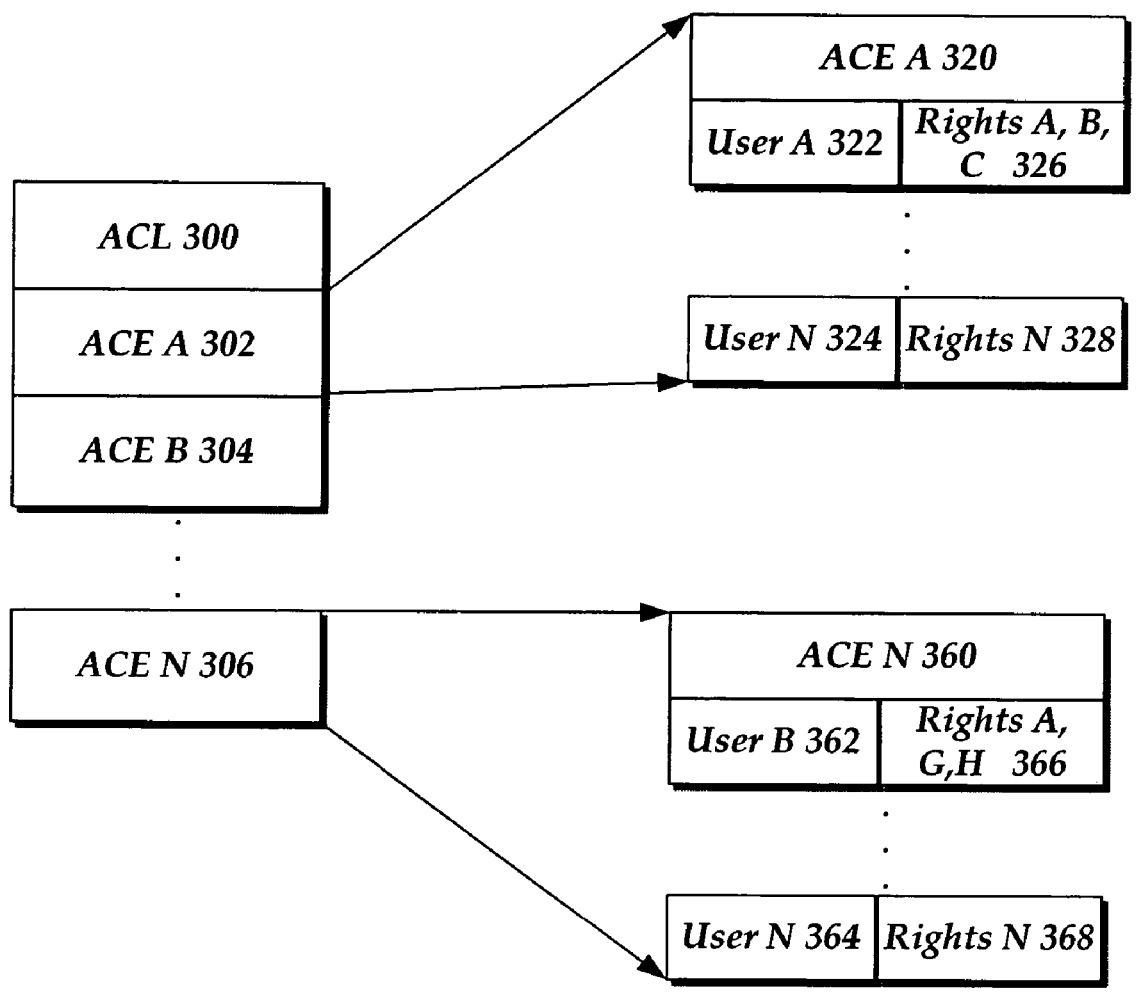
FIG. 3 is a table of an example access control list (ACL) of the metadata store of FIG. 2)

An example ACL associated with a single object (e.g., system, entity, method, parameter, parameter type, and the like) is illustrated in the table 300 of FIG. 3. The ACL 300 contains a list of one or more ACEs 302, 304, 306. Each ACE may be represented by an ACE identifier which identifies the associated ACE. In one example, the ACE identifier may be the ACE itself, i.e., the list of authorized user identifiers and the associated rights for each associated user identifier. As shown in FIG. 3, the ACE identifier may be an identifier indicating a data structure storing the associated ACE list of user identifier(s) and rights. For example, ACE 302 may indicate the data structure 320 which contains the user identifiers 322, 324 and their associated rights identifiers 326, 328. In a similar manner, the ACE 306 may indicate the data structure 360 which contains the user identifiers 362, 364 and their associated right identifiers 366, 368. To simplify finding the correct ACE associated with a requesting user, the ACE identifier 302, 304, 306 may include at least a portion of the user identifier or some other user indicator that may be received from or discovered about the requesting user.

It is to be appreciated that one or more objects may share the same ACL and/or one or more ACLs may share the same ACEs. In this manner, global rights of a user may be tailored to individual services with multiple ACLs and/or ACEs, or collectively changed for all services with multiple ACLs referring to a single ACE.

When an object is instantiated in the metadata store, the service system module 190 may determine a default security setting for the object. The default security setting may be the same or different for different types of objects. For example, a new system object may have an open (or no) security setting, meaning that unless otherwise indicated in an ACL, that all users will have all rights. However, entities, and method instances associated with the system may have a closed security setting, meaning that unless otherwise indicated in an ACL, no users will have rights in the object. It is to be appreciated that any default security setting may be used as appropriate.

In some cases, an object may have a default security setting derived from a parent object to provide or deny access to the service or resource associated with the object. For example, as noted above, the object hierarchy may include any combination of a system, entity, method, parameter, parameter type, and any other suitable object type. Thus, an instantiated entity object may inherit the security or ACL from its parent system object. In one example, the security settings (e.g., ACL) may be inherited only from a direct parent. In another example, the ACL may be inherited from one or more of any ancestors (parents, grandparents, etc.) of the object. For example, a lower hierarchical object, such as a parameter may inherit the ACL only from its parent object, e.g., the associated method object. The method object may have its own ACL, or may refer to its own parent's ACL, e.g., the entity object. In another example, a lower hierarchical object, such as a parameter may inherit the ACL from any or all of its ancestral objects. More specifically, a lower hierarchical object may inherit the ACL from its parent, e.g., the method object, and may combine it with the ACL from the grandparent, e.g., the entity object, and may further combine it with the ACL from the great-grand-parent, e.g., the system object. The combination of multiple ACLs from ancestral objects may be any suitable combination such as a union of all ACEs contained in the combined ACLs, a merge which removes duplicated ACEs, and an intersection of the ACLs which selects the minimal amount of users and rights that are consistent with all combined ACLs, and the like.

In some cases, an additional or alternative hierarchy may be provided to allow inheritance of security settings, such as ACLs and/or ACEs, to provide or deny access to a service or resource associated with the object. For example, a security hierarchy may be created which allows ACLs and/or ACEs to be inherited outside of the object hierarchy or within the object hierarchy in a predetermined manner.

In one example, each secured object in the metadata store may not have its own ACL associated with the object identifier. In some cases, an object may borrow or refer to an ACL of another object. The 'other object' may be determined as the nearest metadata object that is important enough to have its own ACL. The nearest metadata object may be defined in any suitable manner. For example, the nearest object may be defined as the nearest ancestor (e.g., parent, grand-parent, and the like) of the object as defined within the object hierarchy for an instantiated system. In another example, the nearest object may be defined as the nearest relative (e.g., parent, child, grand-parent, and the like) of the object as defined within the object hierarchy for an instantiated system. In another example, the nearest object may be defined as another object in the metadata store which is most similar to the object. For example, if the object is a parameter indicating the customer list in a SAP application, then the nearest object may be the customer parameter from a similar system, such as another SAP application or a SIEBEL application.

Figure 4:
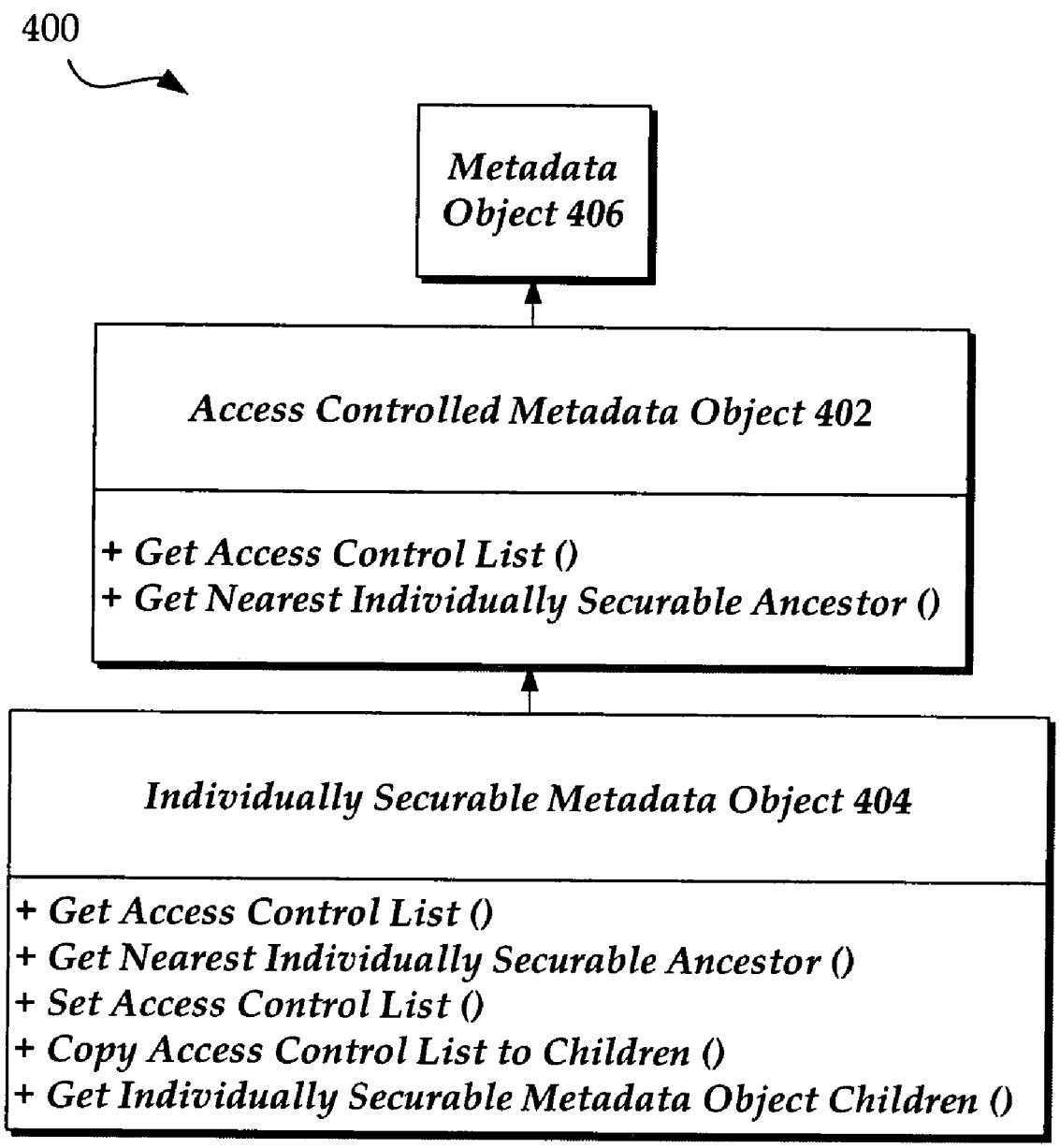
FIG. 4 is a schematic diagram of a securable object hierarchy compatible with the enterprise environment of FIG. 1.

To implement a hierarchical and hereditary security from one object to another, a security hierarchy may be generated. Any suitable hierarchy may be used. For example, FIG. 4 illustrates an example hierarchy 400 of security object classes that may be used to define inheritance. In addition to an unsecured object 406, the hierarchy 400 introduces two abstract object classes, the access controlled metadata object 402 and the individually controlled metadata object 404. The access controlled metadata object may represent the class of objects that need access control, such as through an ACL, regardless of the source of the ACL. The individually controlled metadata object 404, which is itself an access controlled metadata object, supplies an ACL that it owns.

The metadata object 406 may be used to classify objects that require no security or user authorization. One example of an object that may be classified as a metadata object 406 may be a filter.

The access controlled metadata object 402, that is not an individually controlled metadata object, does not own its own ACL, but rather, depends on an ACL from another object, such as an individually controlled metadata object. In this manner, the access controlled metadata object may use subclassers to implement a method that will provide a link to the nearest ancestor that is individually securable (i.e., owns an ACL). One example of an object that may be classified as an access controlled metadata object may be an action object and/or a parameter object.

In one example, the access controlled metadata object may be implemented as an API. The access controlled metadata object 402 API may provide one or more methods or functions. The methods may include a get access control list, which may retrieve the appropriate ACL from the nearest individually securable ancestor. The access controlled metadata object 402 may provide a method such as get nearest individually securable ancestor which determines the owner of the desired ACL. As noted above, the nearest ancestor may be determined in any suitable manner. For example, the nearest ancestor may be the nearest relative (e.g., child, parent, grandparent, and the like) which is an individually securable object or may be the nearest ancestor from a higher level of the hierarchy (e.g., parent, grandparent, and the like). Proximity to the access controlled metadata object may be determined in any suitable manner, such as type of object or number of 'generations' or levels away in the object type hierarchy (e.g., system, entity, method, parameter, parameter type, and the like).

The individually securable metadata object 404 owns its own ACL. The individually securable metadata object may return itself when asked for the nearest individually securable ancestor, which may fulfill the definition for access controlled metadata objects. In turn, the individually securable metadata object may put a requirement on subclasses to supply all individually securable child objects of the individually securable metadata object, such that the individually securable object can copy or propagate its own ACL to its children if necessary. One example of an object that may be classified as an individually securable metadata object may include a system object, an entity object, a method object, a method-instance object, and the like.

Similar to the access controlled metadata object, the individually securable metadata object may be implemented as an API. The individually securable metadata object 404 API may provide one or more methods or functions. Since the individually securable metadata object may be the access controlled object itself, the individually securable metadata object may 'inherit' one or more of the functions or methods provided by the access controlled metadata object, such as the get access control list, get nearest individually securable ancestor, and the like. The individually securable metadata object may provide any other suitable functions and/or methods in addition to or alternative to the methods inherited form the access controlled metadata object. For example, the methods may include a set access control list, which may allow a user to populate and/or modify the access control list (and associated access control entries) owned by or associated with the individually securable object. The individually securable metadata object 404 may provide a method such as copy access control list to children, which may propagate the access control list to the children of the object classified as the individually securable metadata object. The propagation of the ACL may affect all children of the object, or may affect only a predetermined number of generations, a predetermined set of children (such as through a parameter list input, and the like).

To determine the children of the individually securable metadata object, the individually securable metadata object may provide a method to get the children of the individually securable metadata object children. The children of the object classified as the individually securable metadata object may be determined in any suitable manner. For example, children may be defined as those objects that depend from the object classified as the individually securable object as determined within an object hierarchy (e.g., system, entity, method, parameter, and the like).

The factoring provided by the security hierarchy of FIG. 4 may allow objects to subclass individually securable metadata object APIs when access checks are required to be as fast as possible (without requiring walking the object metadata tree (e.g., system containing entities, which contain methods, with contain parameters, etc.) since the ACL is on the individually securable metadata object itself. In some cases, an object should not subclass the individually securable metadata object if it is fine-grained since the storage associated with an ACL and the time to propagate it may be significant. In addition, the access check may be able to tolerate the time taken to walk up the metadata object hierarchy (e.g., system containing entities, which contain methods, with contain parameters, etc.) to find the nearest object with its own ACL.

The security classification of an object may be indicated in any suitable manner. For example, the metadata store 180 may store a security type indicator indicating the classification of the object. In another example, the object identifier may indicate the classification. In another example, the object itself (e.g., code defining the object) may define and/or indicate the security classification.

Figure 5:
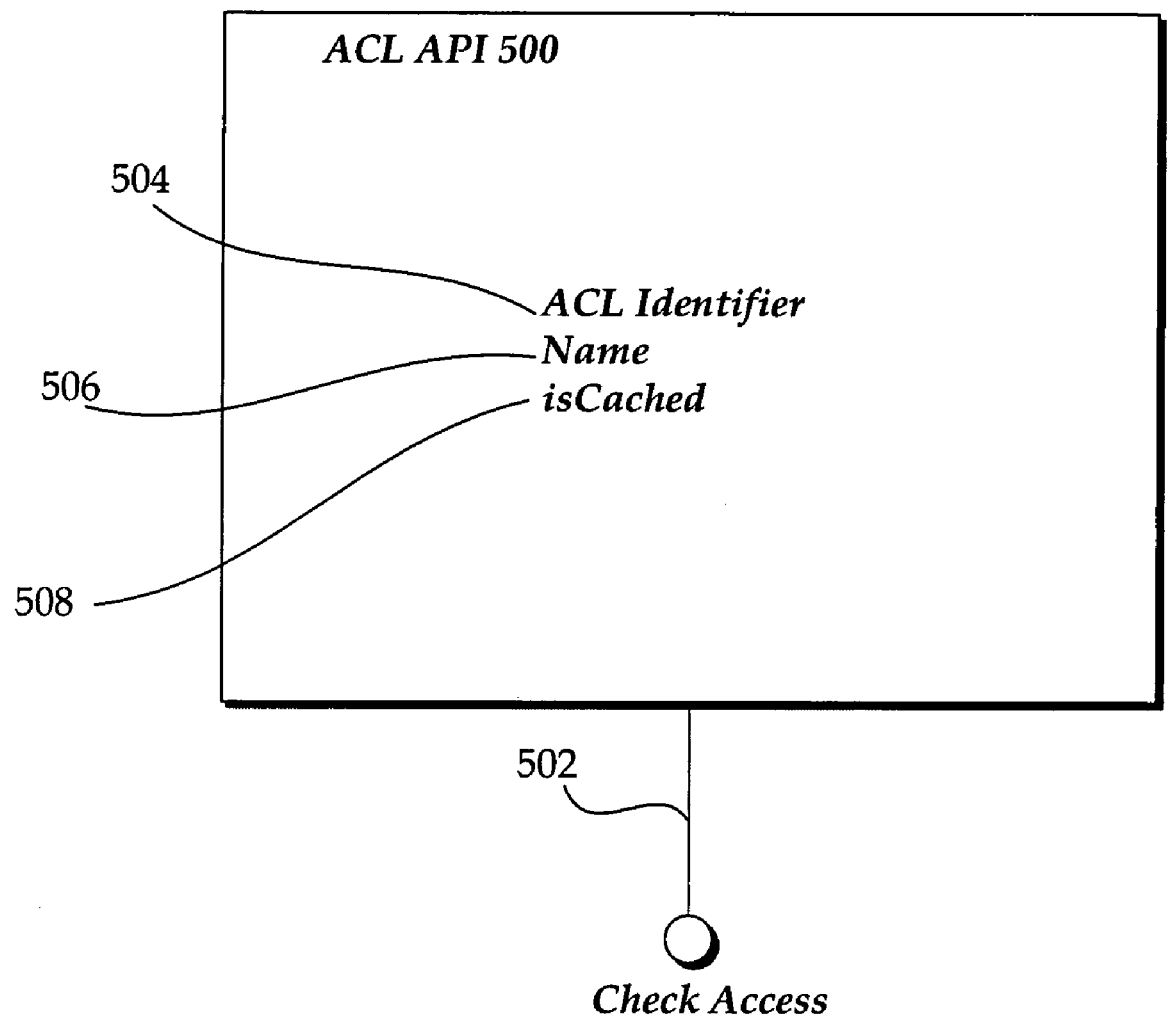
FIG. 5 is a schematic diagram of an example API for implementing an access control list of an object.
Figure 6:
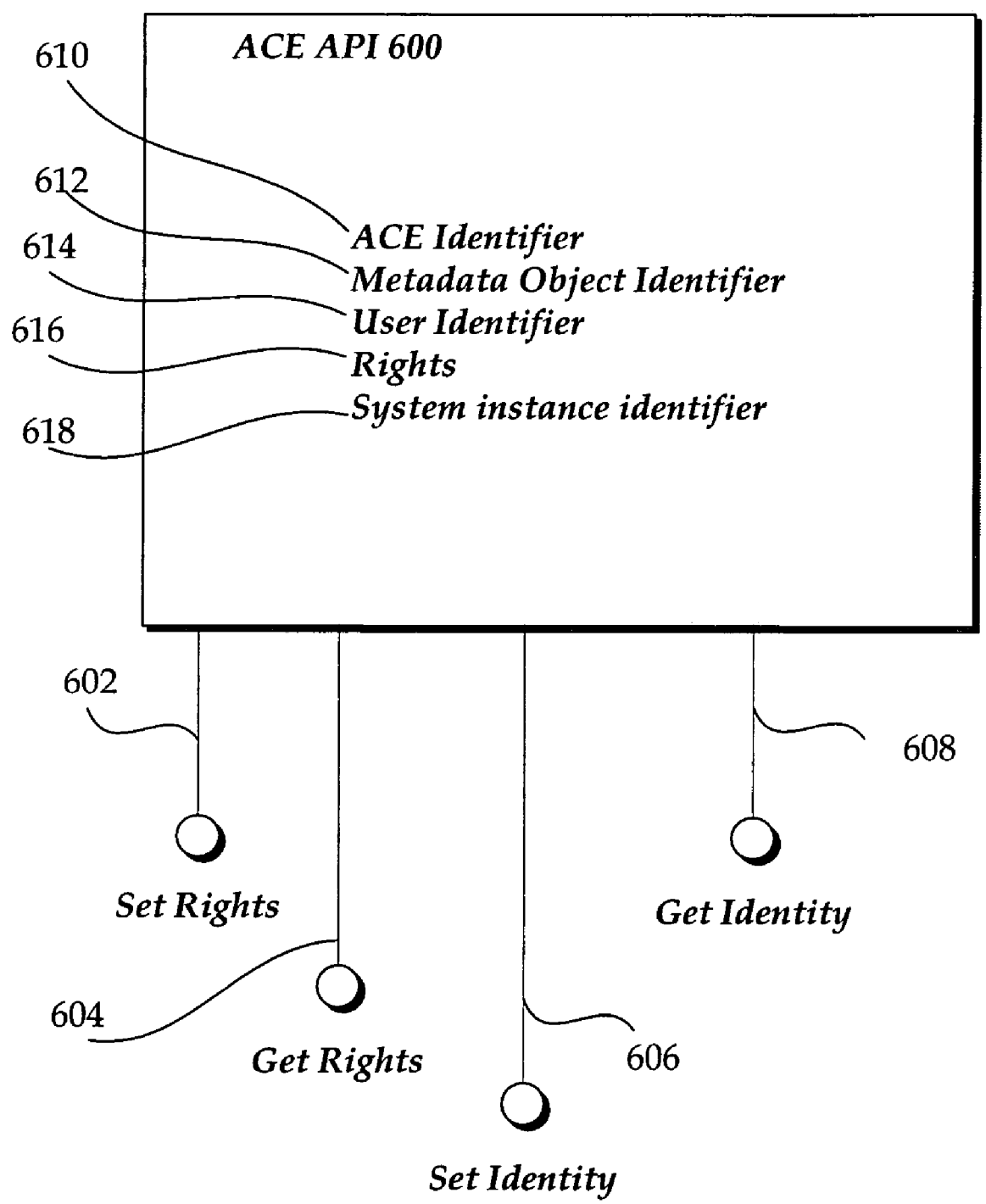
FIG. 6 is a schematic diagram of an example API for implementing an access control entry of an access control list of FIG. 5.

In one example, the ACL and/or ACE may be implemented by the enterprise system using an application program interface. For example, each class or type of object may have an associated ACL API and/or ACE API. The class or type of object sharing an API may be related to the object hierarchy (e.g., system, entity, method, parameter, and the like) and/or may be related to the securable object hierarchy (e.g., object, access controlled object, individually securable object, and the like). It is to be appreciated that the ACL and ACE APIs may be created in accordance with any one or more individual or group features of the underlying objects. FIG. 5 illustrates a representation of an example ACL API 500 and FIG. 6 illustrates a representation of an example ACE API 600. The APIs may have any suitable input, output, and/or function. For example, as shown in the example ACL API 500 of FIG. 5, the function of the API may be to check access 502. More particularly, to check access, the ACL API 500 may verify that the requesting user is listed in an associated ACE and is associated with the appropriate rights. To check the access, the ACL API 500 may implement the ACE API 600 of FIG. 6.

The ACE API, when implemented may provide any one or more of the functions of set identity 606, get identity 608, set rights 602, get rights 604, and the like. The set identity 606 may be implemented to create and/or modify the user identifiers listed in the ACE. In this manner, new user identities authorized for a particular object may be simply added or deleted by adding or deleting a row or record to the ACE, or the entire or portions of the ACE may be replaced as a group. The get identity 608 may be implemented to view and/or verify the list of one or more user identifiers listed in the ACE. The set rights 602 may be implemented to create and/or modify the rights of an associated user listed in the ACE. In this manner, the rights function associated with a user identifier may be simply and/or centrally manipulated by adding or deleting rights as desired in the ACE of a particular object. The get rights function 604 may be implemented to view and/or verify the list of one or more rights associated with a listed user identifier. In this manner, the check access function 502 of the ACL API 500 of FIG. 5 may implement the get identity function 608 to verify that the user is authorized in some manner. Specifically, the results of the get identity function may return a complete list of authorized users which may be compared to the user identity of the requesting user. In another example, the requesting user's identifier may be provided to the ACE API, and when the get identity function is implemented, a verifier may be returned that the indicated user identifier is included or excluded from the list of user identifier(s) in the ACE. In another example, the requested service or right of access may be provided to the ACE API, and the get user function may return a list of user identifiers which have the indicated right to access. The check access 502 of the ACL API 500 may implement the get rights function 604 to verify that the identified user has the appropriate rights to access the service. In one example, the user identifier may be provided to the ACE API, and the associated rights of that user may be returned and then compared to the requested service in the user request. In another example, the user identifier and the requested service may be provided to the ACE API, and the get rights function may return a verifier that the indicated right of access is authorized or not authorized. It is to be appreciated that the authorization of the user and associated requested right to access may be verified in any suitable manner.

The ACL API 500 of FIG. 5 may include one or more indicators or identifiers which describe the ACL API. For example, the ACL API may include one or more of an ACL identifier 504, an ACL description which may be a description of the ACL or indicator of the object associated with the ACL, a cache indicator 508 which may indicate whether the ACL is cached in memory or must be retrieved from storage, and the like.

The ACE API 600 of FIG. 6 may include one or more indicators or identifiers which describe the ACE API. For example, the ACE API may include one or more of an ACE identifier 610, a metadata object identifier 612, a user identifier 614, a rights identifier 616, a system instance identifier 618, and the like. The ACE identifier 610 may be any suitable identifier which identifies the ACE. The metadata object identifier 612 may be any suitable object identifier associated with the ACE. For example, the metadata object identifier may include a reference to the object such as a system object, an entity object and the like. The user identifier 614 may include the list of users who are authorized to access the associated object under the rights indicated by the right identifier(s) 616. The system instance identifier 618 may be used in some cases to indicate a particular instance of a system object. For example, multiple instances of a system may be instantiated for a single securable object like a method instance. For example, if thee are one hundred system instances of a product studio system (e.g., one of applications 150 of FIG. 1), the one or more method instance objects of the system can have separate ACLs for each system instance. The system instance identifier may be optional since it may be relevant for objects that are not systems or system instances.

Figure 7:
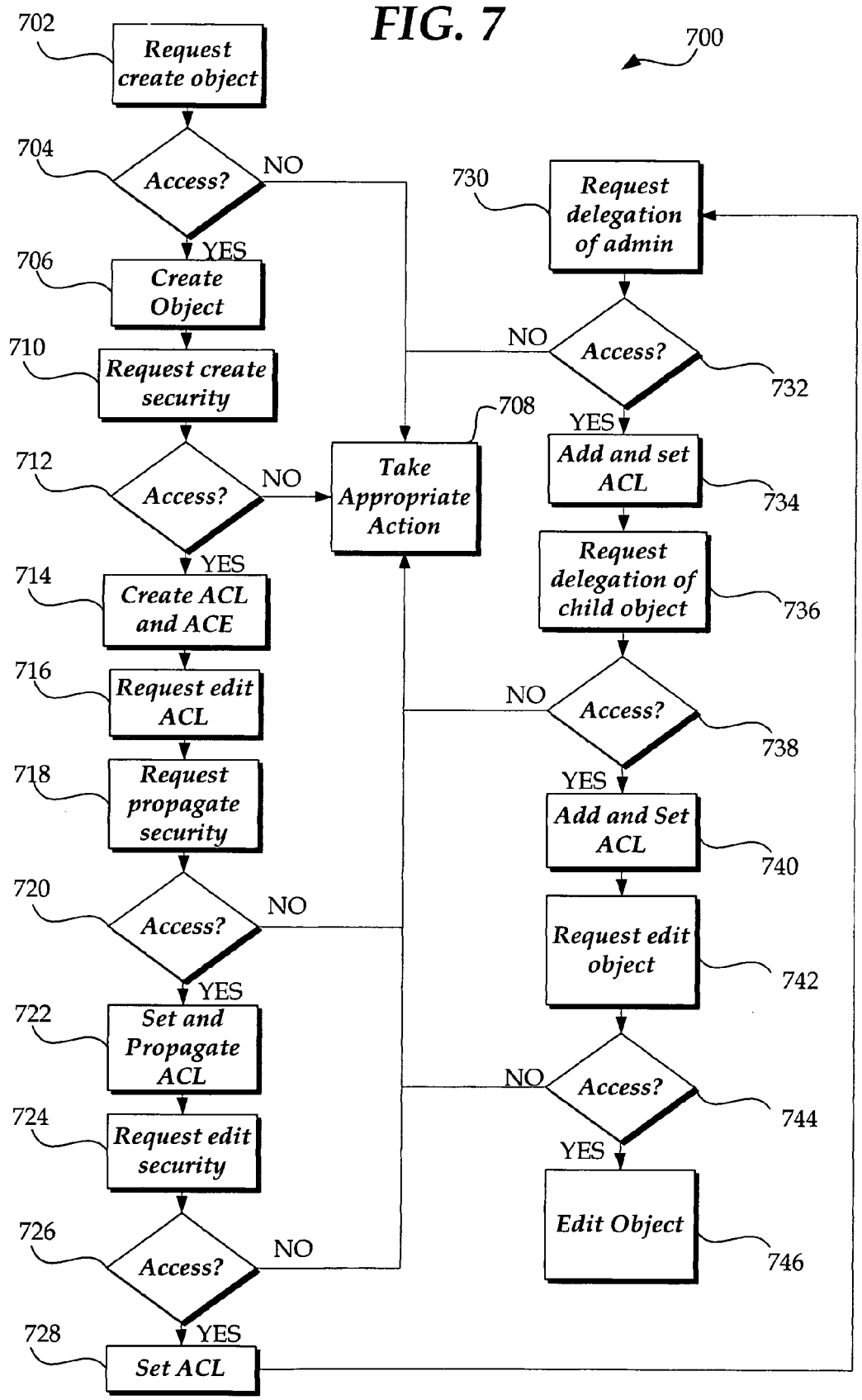
FIG. 7 is a flow chart of an example method of populating and implementing a metadata store of the enterprise environment of FIG. 1.

FIG. 7 illustrates an example method 700 of creating and populating the metadata store 180 of FIG. 1. It is to be appreciated that any combination and order of the below described operations may be implemented as appropriate.

To set up the metadata store, a user, such as a developer, may request to create 702 a metadata object. In response to the request to execute a method (e.g., create an object), the service system module 190 of FIG. 1 may determine 704 if the requesting user has access to the requested method object. For example, the service system module 190 of FIG. 1 may use a method similar to method 800 described further below with reference to FIG. 8. If the user is not authorized to execute the method, appropriate action may be taken 708, such as returning a notification that the user is not authorized to access the service or an alternative service may be provided (e.g., view a file rather than edit a file). If the user is authorized to execute the method, the metadata object may be created in any suitable manner.

For example, the user may want to write code to load a new metadata package (e.g., family of related object). In one case, the user may enter:

```
Using Microsoft.Office.Server.ApplicationRegistry.Administration;
// package URL
Uri packageUri = new Uri ("file://c/bla");
// create a new system object
System new system =
ApplicationRegistry.LoadFromPackage(packageUri);
```

When the new system is created using the .LoadFromPackage( ) method, an access check of operation 704 above may be performed to verify that the requesting user has the load from package (or execute) right associated with its user identifier in the ACE associated with the load from package method. In some cases the execute right may not be useful unless it is also accompanied with an edit right. For example, the method may be executed, but the results of the execution (e.g., a new metadata object) may not be imported if the right to edit an object is not also authorized. When the package is loaded, the child metadata objects (e.g., entities, methods, and the like) may be created with default ACLs that mirror the original parent ACL. In some cases, all metadata objects may have a load from package (method) to allow packages to be authored at any level in the metadata object hierarchy.

If the parent object or any object in the package does not have an associated ACL, the security parameters of the object may be created to set up security on a meta data object. The user may request 710 to create an ACL associated with a particular object. In response to the request to edit the ACL (i.e., edit, as used herein, includes create, create child, delete, update, and the like), the service system module 190 of FIG. 1 may determine 712 if the requesting user has access to the requested method object. For example, the service system module 190 of FIG. 1 may use a method similar to method 800 described further below with reference to FIG. 8. If the user is not authorized to execute the method, appropriate action may be taken 708. If the user is authorized to execute the method, the ACL may be created 714 and populated with indicated user identifiers, rights associated with one or more user identifiers, and the like.

For example, a user may want to write code to create or edit an ACL. In one case, the user may enter:

```
Using Microsoft.Office.Server.ApplicationRegistry.Administration:
// obtain a handle to a metadata object
MethodInstance mi = MethodInstance.GetById(333);
//Read
SPGenericAcl acl = mi.GetAcl( );
// Set
mi.SetAcl(acl);
```

In the above example, the access check 712 may be performed in the .SetAcl( ) method on any metadata object. The access check may stipulate that the requesting user of the SetAcl( ) method must have the set permissions right in the ACL of the object (here method instance object mi), or must have a set permissions right on the parent of the object. The ACL (here Acl) may be required to contain at least one ACE that provides some user identifier with the set permissions right to preclude the creation of an object that cannot be administered.

To populate the ACL and/or ACE of the object, the service module 190 may provide a user interface to facilitate location and entry of user identifiers, rights, and the like. Examples of user interface displays are illustrated in FIGS. 9-12. Although it is to be appreciated that any suitable user interface and associated controls may be provided to the user to facilitate editing objects and associated metadata values.

Figure 9:
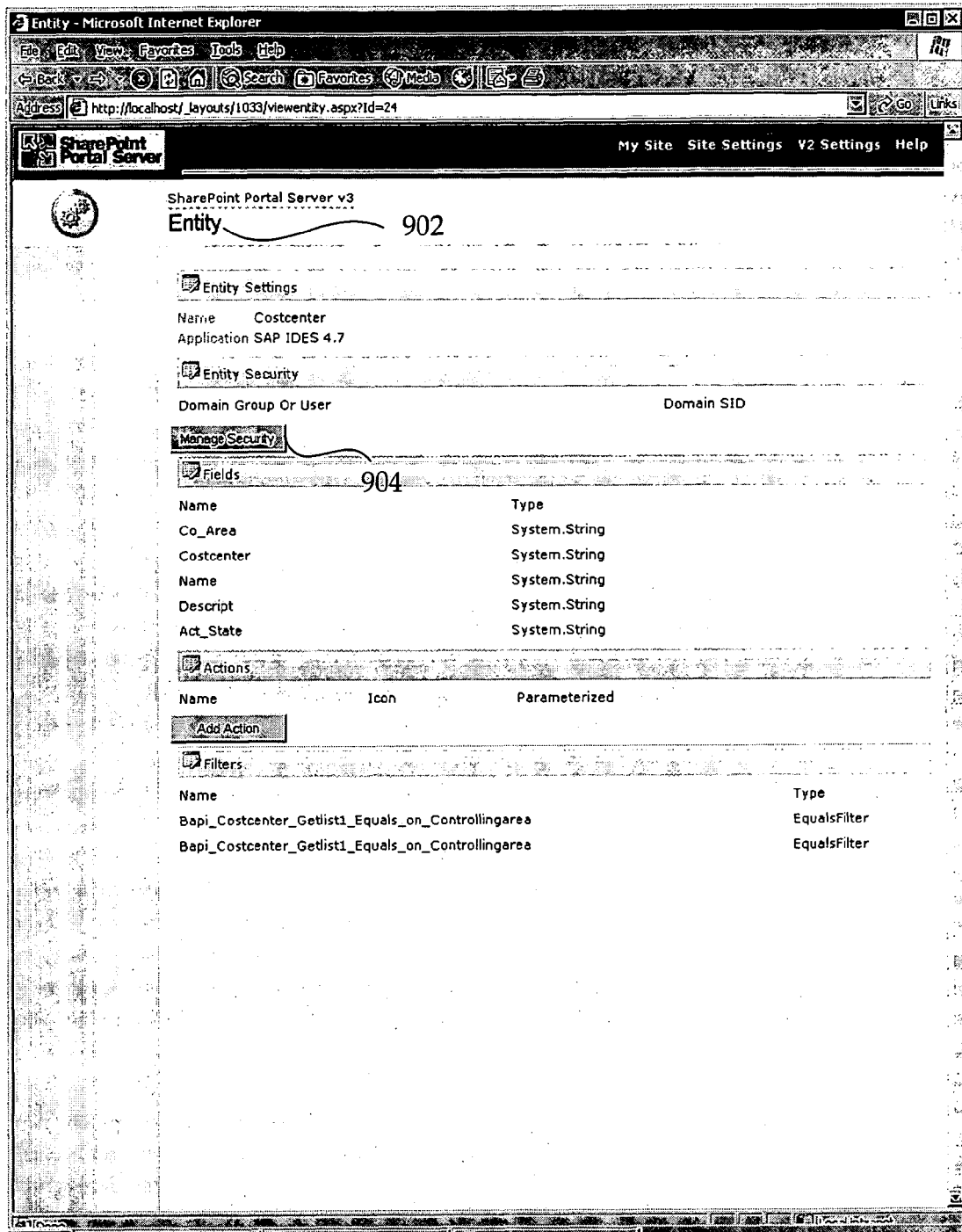
FIG. 9 is an example display of an administration user interface of an object.

FIG. 9 illustrates an administration user interface 900 for administering to a metadata object of the type 902 of entity. The security parameters of the object may be accessed by selecting the security button 904, although it is to be appreciated that the security parameters may be accessible directly in the administration user interface display or through any suitable user interface control. If the current user is not authorized to modify the security (e.g., does not have set permission rights) on the metadata object and/or its parent metadata object, then the security button may be disabled, grayed out, not provided, and the like.

Figure 10:
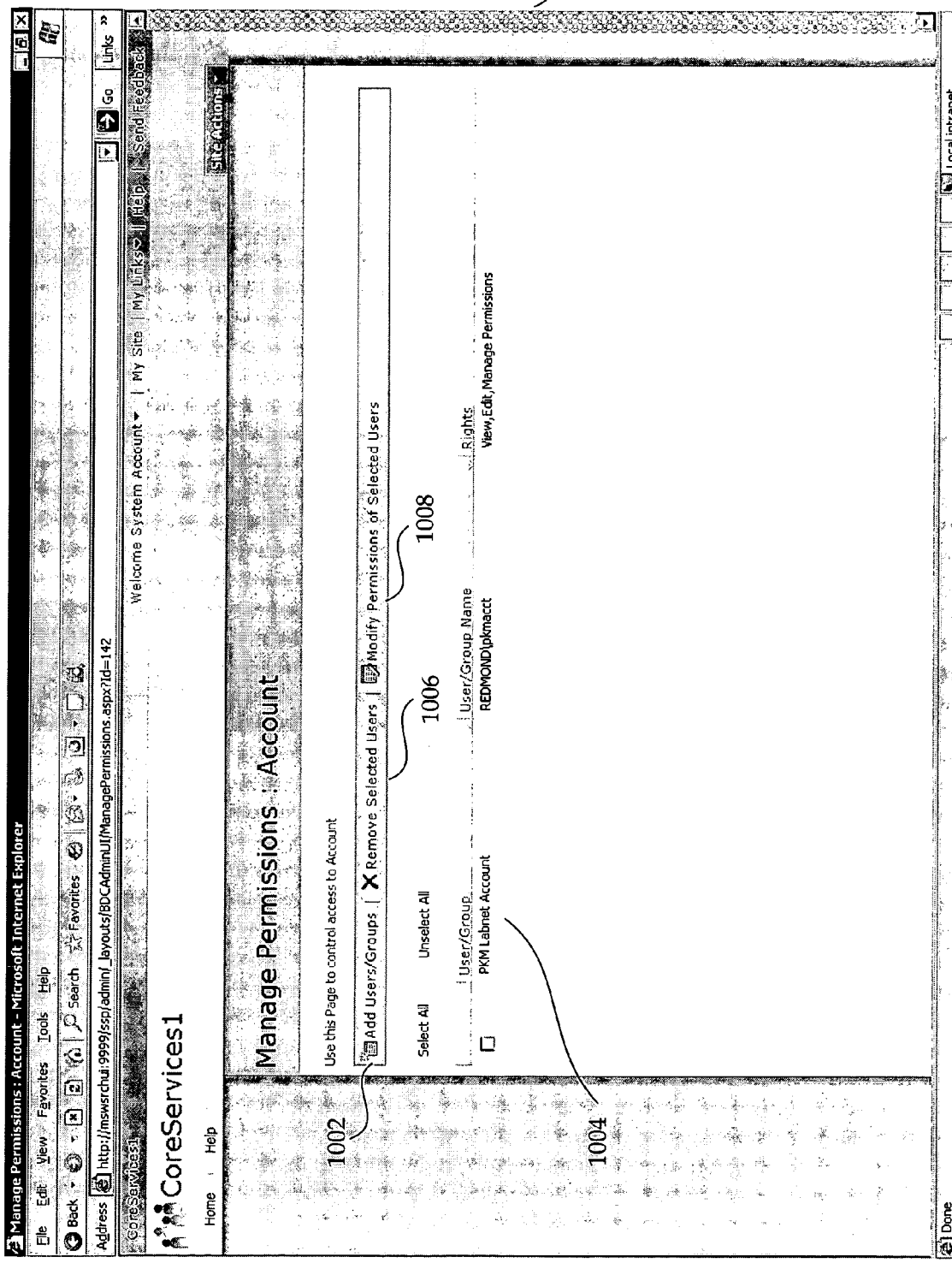
FIG. 10 is an example display of a manage permission user interface of an object.

In response to selection of the security button 904, the service module 190 may display the manage permission interface, such as the manage permission interface 1000 illustrated in FIG. 10. The manage permissions interface may represent the ACL for the object that referred the user to the interface page. In the interface 1000, each row 1004 may represent an ACE. In a newly instantiated object, the list of ACEs may be null. To create more authorized users for an object and their associated right, the permissions page 1000 may make a new user entry directly available or may allow entry of new user identifiers to be accessed through any suitable interface control, such as add users button 1002. Other suitable interface controls may be provided which allow removal of users from an ACE, such as remove users button 1006, modify permissions of selected users button 1008, and/or any other suitable interface control to allow a user to access, modify, and/or maintain an object.

Figure 11:
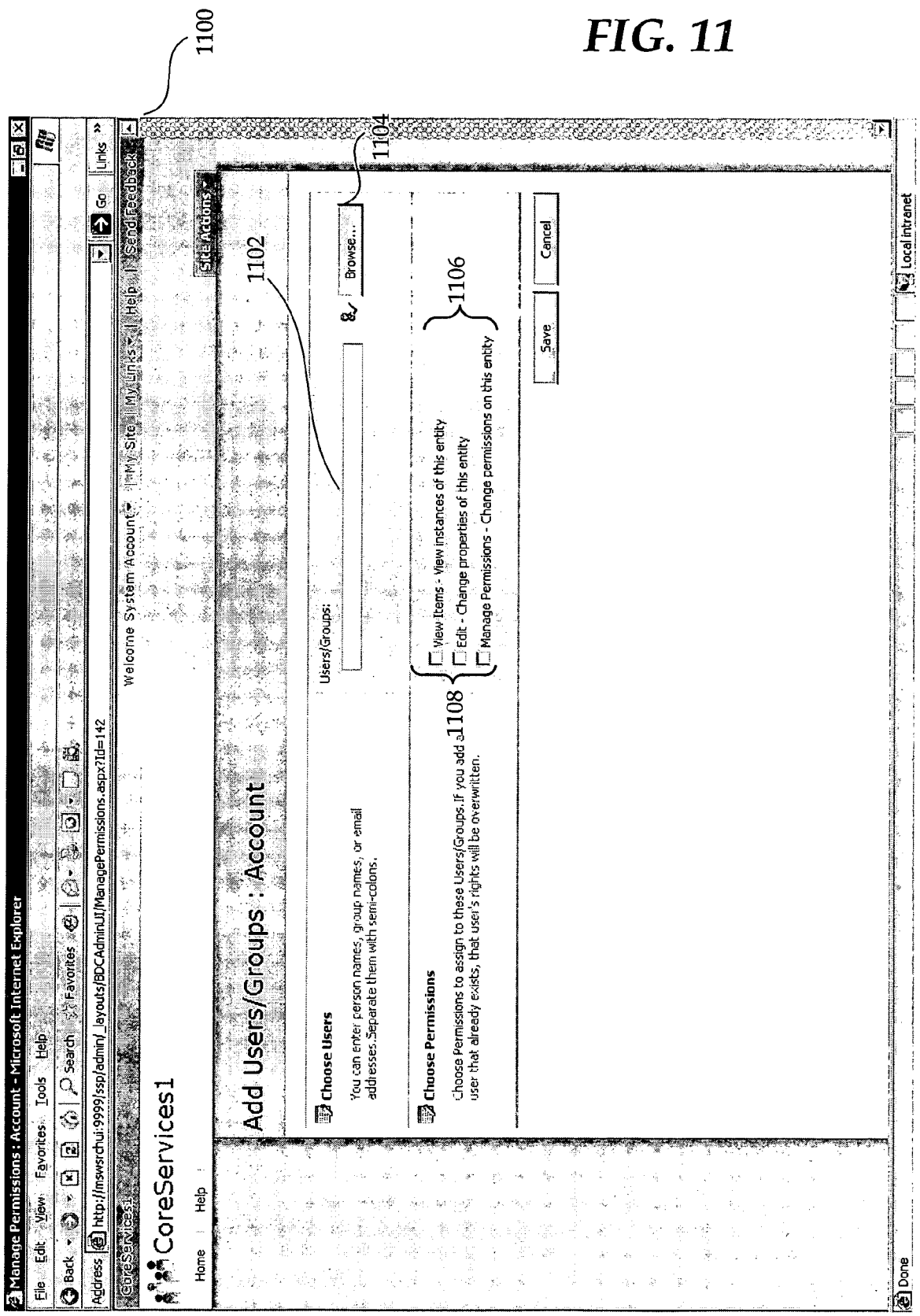
FIG. 11 is an example display of an ACL editing user interface.

In response to selection of the new users button 1002, the service module 190 may display the add users interface, such as the add users interface 1100 shown in FIG. 11. The user may provide user identifiers through any suitable control. For example, as shown in FIG. 11, the user may enter user identifiers into the users text box 1102 and/or by selecting discoverable user identifiers through the browse button 1104. The rights associated with the indicated one or more users may be provided in any suitable manner. For example, upon entry of a user identifier, default rights may be associated with the user identifier unless modified by the user. In another example, the add user interface may provide a list or other selection of available rights which may be selected or indicated in any suitable manner. The interface of FIG. 11 illustrates available rights 1106 with associated check box controls 1108.

Figure 13:
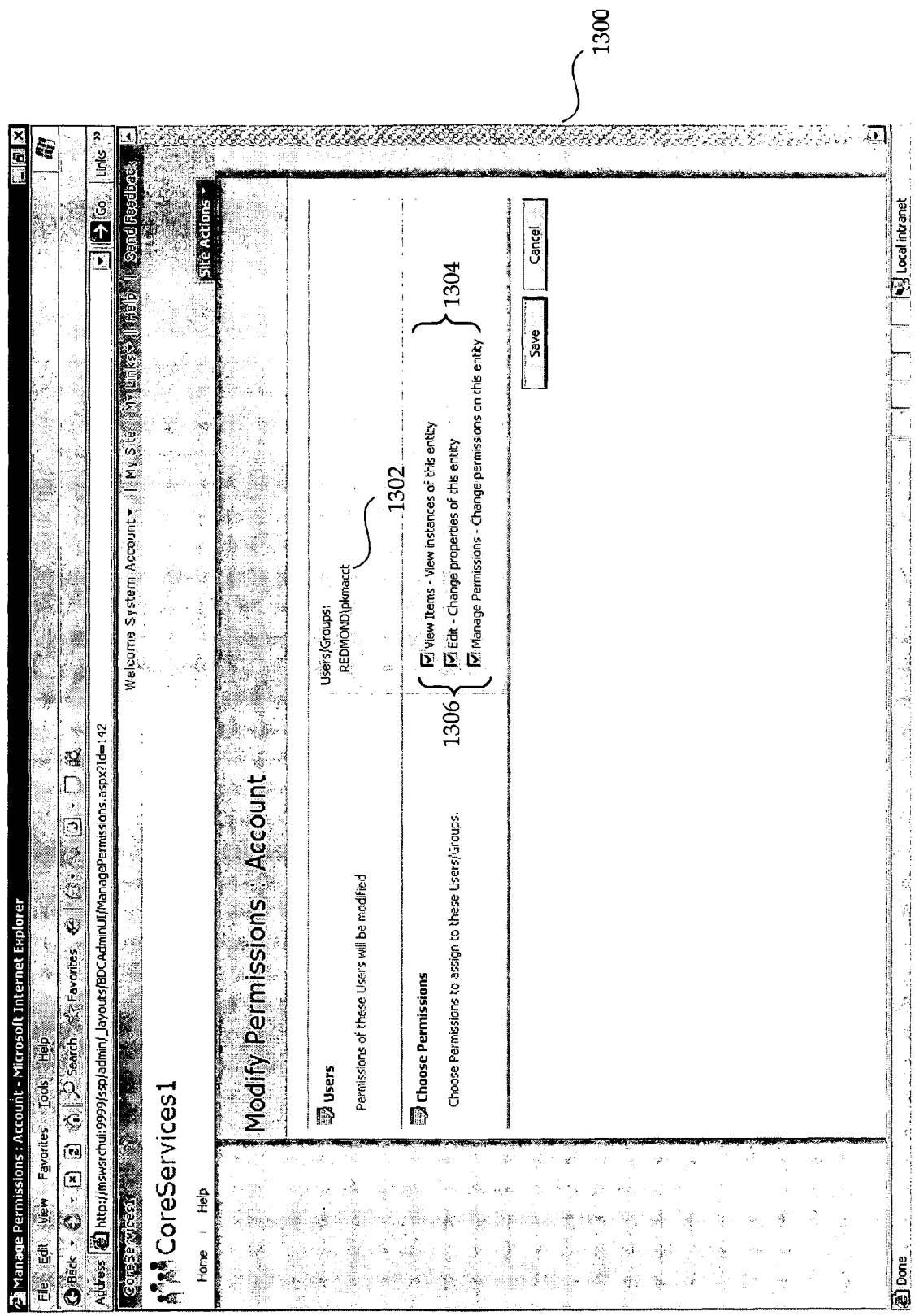
FIG. 13 is an example display of a modify permission user interface.

In response to selection of the modify permissions button 1108 of FIG. 11, the service module 190 may display the modify permissions users interface, such as the modify permission user interface 1300 displayed in FIG. 13. The user may select one or more users in the user interface of FIG. 11 and the modify permissions interface may allow permission for those selected users to be modified. In another example, a modify permissions page may allow selection or entry of an existing or new authorized user of the object and allow permissions to be modified and/or created. As shown in the example user interface of FIG. 13, the modify permission interface may display the user identifier 1302 for the associated object. The user interface may also display the associated permissions for the displayed users and/or the available options that may be selected for that user. For example, with reference to FIG. 13, the available permission options 1304 for the associated object and associated user 1302 are displayed with an associated control, such as the check box 1306, which may indicate and allow manipulation of the permission as selected (e.g., checked) or prohibited (e.g., not checked). By manipulating the associated control (e.g., the check boxes 1306), the user may select and/or deselect available permissions. It is to be appreciated that any suitable user control interface may be provided such a list boxes, text boxes, radio buttons, and the like.

In some cases, selection of a particular right to be associated with a user identifier may cause other rights to be associated with the user identifier for that or other objects, may modify the role of the user identifier, and the like. For example, if in the process of selecting rights for a new user, the set or manage permission right is selected, the new user may become a delegated administrator for the object and all objects under this object. That is, the admin ACE may be propagated automatically down through the object hierarchy tree.

In some cases a user may wish to edit the security information associated with a metadata object and propagate this information downwards (if not done automatically) on all child metadata objects. A user, such as a developer, may request 716 to edit the ACL of a parent object. The user may request 718 to propagate the security information of the (modified) parent object down to all or any indicated child objects of the parent object. In response to the request to execute a method (e.g., set and propagate an object), the service system module 190 of FIG. 1 may determine 720 if the requesting user has access to the requested method. For example, the service system module 190 of FIG. 1 may use a method similar to method 800 described further below with reference to FIG. 8. If the user is not authorized to execute the method, appropriate action may be taken 708. If the user is authorized to execute the method, the ACL may be modified 722 and then propagated down to the appropriate children of the parent in any suitable manner.

For example, the user may enter code such as:

```
Using Microsoft.Office.Serve4r.ApplicationRegistry.Administration;
//obtain a handle to a metadata object
MethodInstance mi = MethodInstance.GetById(333);
//Read
SPGenericAcl acl = mi.GetAcl( );
//Set
mi.SetAclAndPropagate(acl);
```

In the example above, the access check 720 may be performed in response to execution of the .SetAclAndPropagate( ) method on the object. The access check may stipulate that the requesting user must have the set permissions right on the object or the object's parent. The ACL may be required to contain at least one ACE that provides some user identifier with the set rights permission to preclude the creation of an object that cannot be administered. In the example code above, the ACL is propagated to every child object of the given object automatically. In the example above, execution of editing the ACL for each child object may be automatically authorized since child objects' ACLs may be set if the user has set permission rights in the parent object.

In some cases a user may wish to edit the security information associated with a metadata object. A user, such as a developer, may request 724 to edit the ACL of a parent object. In response to the request to execute a method (e.g., modify an object), the service system module 190 of FIG. 1 may determine 726 if the requesting user has access to the requested method. For example, the service system module 190 of FIG. 1 may use a method similar to method 800 described further below with reference to FIG. 8. If the user is not authorized to execute the method, appropriate action may be taken 708. If the user is authorized to execute the method, the ACL may be modified 728 in any suitable manner.

For example, the user may enter code such as:

```
Using Microsoft.Office,Server.ApplicationRegistry.Administration;
// obtain a handle to the MethodInstance in some manner
MethodInstance mi = null;
//get Acl
SPGenericAcl acl = mi.GetAcl( );
Acl.Clear;
```

```
//create an Ace
SPGenericRight rights = new SPGenericRights( );
SPBasePermissions perms = BdcRightsMapper.MapToWss.Execute)
Rights.GrantRightsMask = perms;
String providerName = ProviderPickerControl.TextBox( );
String principalName = UserpickerControl.TextBox( );
SPGenericAce ace =
new SPGenericAce(providerName + "\" + principalName, rights);
//add Ace and set Acl
Acl.Add(ace);
//will take time to propagate change to runtime OM
mi.SetAcl(acl);
```

The ACL Object Model ("OM") may be Windows® SharePoint Services™ (WSS) or any other appropriate web infrastructure. The OM may provide basic authentication, persistence, infrastructural and/or other security services to the enterprise system components. As shown in the above example, the OM may provide default security values, such as rights, which may be referenced and implemented by the ACL and/or ACE. In response to setting the ACL, the security change may be substantially immediately changed within the context of the OM of the enterprise system. However, since metadata objects may be cached by a runtime OM, there may be a time lag before the changed ACL is observed on all components by the runtime OM.

Although the above example illustrates editing security parameters of an object, any parameter, feature, setting, and the like may be modified, such as the identifier of the object, an instance of an object, and the like. As noted above, editing includes modifying, updating, creating, deleting functions, and the like. As shown in FIG. 7, a user may request 742 to edit an object. In response to the request to edit an object (e.g., a request to execute a method), the service system module 190 of FIG. 1 may determine 744 if the requesting user has access to the requested method. For example, the service system module 190 of FIG. 1 may use a method similar to method 800 described further below with reference to FIG. 8. If the user is not authorized to execute the method, appropriate action may be taken 708. If the user is authorized to execute the method, the object may be modified 746 in any suitable manner.

In one example, a user may desire to write code to update an Entity's name, create a new object identifier for the Entity, and then delete the System that contains the Entity object.

For example, the user may enter code such as:

```
Using Microsoft.Office.Server.ApplicationRegistry.Administration;
//get the Entity object
Entity poorlyNamedEntity = Entity.GetById(321);
PoorlyNamedEntity.Name = 'amuch better name'
poorlyNamedEntity.Update( ); //access check 1
PoorlyNamedEntity.Identifiers.Create("newIdName"); //access check 2
System uglyUnwantedSystem =
poorlyNamedEntity.System.Delete( ); //access check 3
```

As shown in the example above, more than one access check may be performed by the data store service system 160 of FIG. 1. In the example above, three access checks may be performed in response to the request to create the child object, delete the system object, and updating the ACL of an object. However, it is to be appreciated that one or more access checks may be performed at the same time. For example, in the example above, each of the executed methods may require an edit right to a metadata object (e.g., create, delete, update), and thus, the three access checks may be performed with a single access data check for that right, however, it is to be appreciated that the edit right may be different for the identifier user for the three different objects edited (e.g., the child object, the entity object, and the system object, and thus may need a separate access check for each object.

Figure 12:
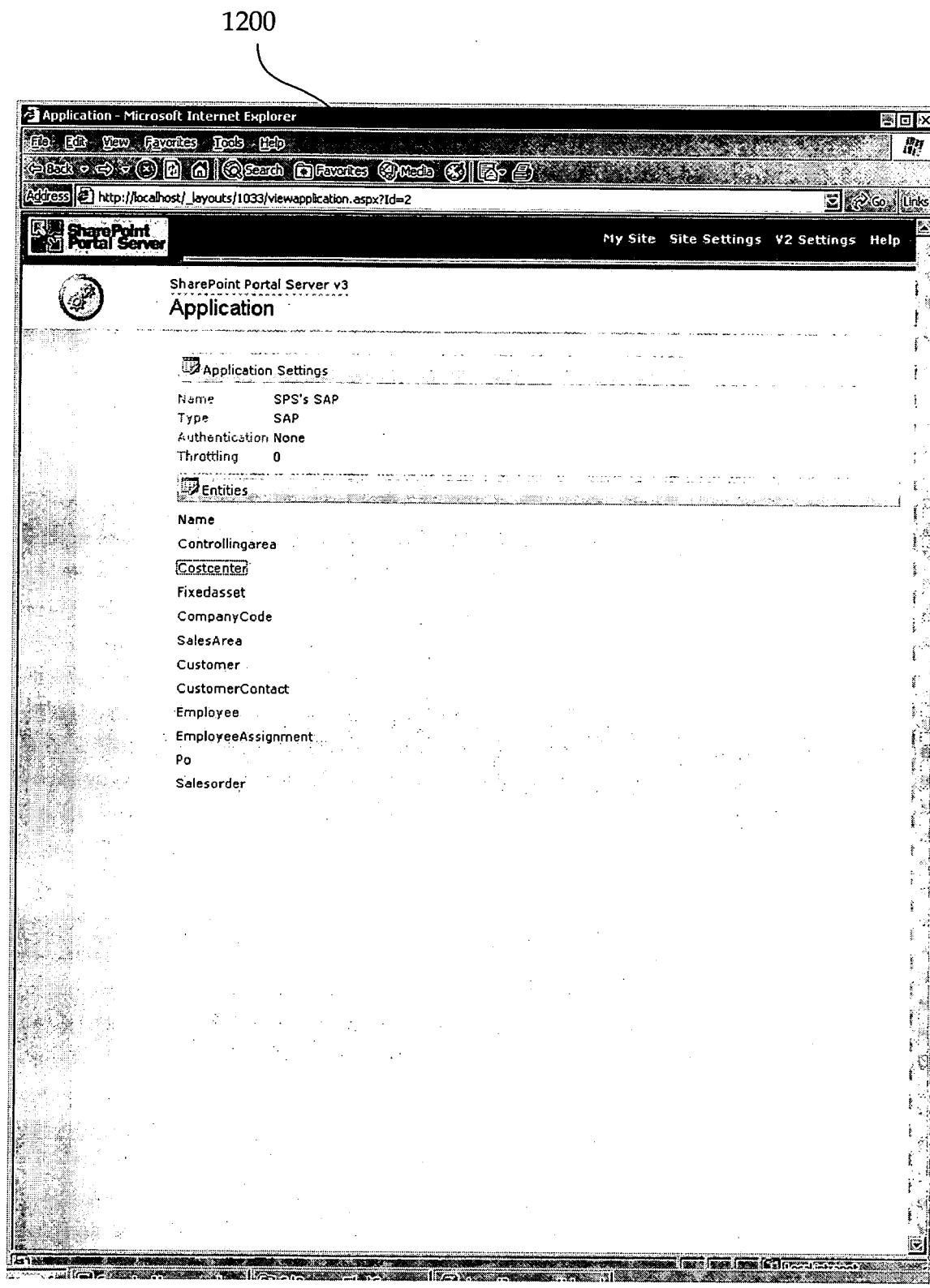
FIG. 12 is an example display of an object editing user interface.

A user may wish to alter some metadata stored in the metadata store 180 of FIG. 1. For example, a user may wish to alter the connection string on an application, e.g., the connection information 204 associated with a system object, as shown in the metadata store of FIG. 2. In some cases the service system 190 of FIG. 1 may provide an edit object page to facilitate editing the object metadata. An example edit application object page 1200 is shown in FIG. 12. When the edit application page is presented to the user, an access check may be performed against the ACL associated with the application object to verify that the identified user has the proper edit right. If the access check fails, the user may be denied access to the object page, such as object page 1200, or alternatively, the object page may be displayed, but the edit function of fields within the page may be turned off, e.g., a read-only view of the page.

As noted above, an object may have an associated ACL which controls which people have which permissions. In some cases, an object may be created with a default ACL identical to its parent object. In the case of a system object at the top of the hierarchy, the default may create administrative rights in the creator of the object. However, there may exist additional or some subset of rights, such as right to edit an object, right to execute an object (which may result in an application invocation), asymmetric rights, and the like. One example of an asymmetric right is the right to change the rights of the object, which may be included in the administrative rights in the object. The right to change the rights in an object may be delegated to another user. Specifically, the person having the right to change the rights in an object may assign another user to additionally or alternatively have the right to change the rights in the object.

In some cases, the user may wish to delegate the administrative rights of that object and all underlying (child) objects to another user. A user, such as a developer, may request 730 to delegate administrative rights of an object and its children. In response to the request to execute a method (e.g., set and propagate an object), the service system module 190 of FIG. 1 may determine 732 if the requesting user has access to the requested method. For example, the service system module 190 of FIG. 1 may use a method similar to method 800 described further below with reference to FIG. 8. If the user is not authorized to execute the method, appropriate action may be taken 708. If the user is authorized to execute the method, the ACE may be added and the ACL may be modified 734 and then propagated down to the appropriate children of the parent in any suitable manner.

For example, the user may enter code such as:

```
Using Microsoft.Office.Server.ApplicationRegistry.Adminstration;
//obtain handle to a metadata object
MethodInstance mi = MethodInstance.GetById(333);
//Read
SPGenericAcl acl = mi.GetAcl( );
//create an Ace
SPGenericRight rights = new SPGenericRights( );
SPBasePermissions perms =
BdcRightsMapper.MapToWss(BdcRights.SetPermissions)
Rights.GrantRightsMask = perms;
String newAdmin = "newAdminDude";
```

```
SPGenericAce ace =
New SPGenericAce(newAdmin,rights);
//add Ace and set Acl
Acl.add(ace);
//may take time to propagate change to runtime OM
mi.SetAclandPropagate(acl);
```

As a result of the new ACE in the ACL for the object, the user identified with 'newAdminDude' has the right to set permissions on the object. In this manner, the 'newAdminDude' can remove the old admin's right to set permissions in that object or any lower object. However, if the old admin retains a 'set permissions' right in a parent object, then the old admin may be considered to only have delegated administration of the child objects of that parent object. In this manner, the old admin can regain any rights given to 'newAdminDude' since the old admin has set permission rights in a parent of each object currently delegated to the 'newAdminDude'.

In some cases, the administrator of the metadata store (e.g., having set permission rights on all objects within the metadata store) may want to allow another user to have administrative rights in particular types of objects. For example, the administrator may wish another user to have administrative rights in any Entity object but not the Systeminstance object to which the entities belong. Accordingly, the administrator may change MethodInstance execute privileges, but not alter the connection string on the SystemInstance, for example. A user, such as a developer, may request 736 to partially delegate administration of an object and its children. In response to the request to execute a method (e.g., set and propagate an object), the service system module 190 of FIG. 1 may determine 738 if the requesting user has access to the requested method. For example, the service system module 190 of FIG. 1 may use a method 800 similar to that described further below with reference to FIG. 8. If the user is not authorized to execute the method, appropriate action may be taken 708. If the user is authorized to execute the method, the ACE may be added and the ACL may be modified 740 and then propagated down to the appropriate children of the parent in any suitable manner. For example, the user may enter code such as:

```
Using Microsoft.Office.Server.ApplicationRegistry.Administration;
//obtain a handle to a metadata object
System s = System.GetById(333);
//Read
SPGenericAcl acl = s.GetAcl( );
//create an Ace
SPGenericRight rights = new SPGenericRights( );
SPBasePermissions perms =
BdcRightsMapper.MapToWss(BdcRights.SetPermissions);
Rights.GrantRightsMask = perms;
StringNewAdmin = "newAdminDude";
SPGenericAce ace = new SPGenericAce(newAdmin,rights);
//add Ace and set Acl
Acl.Add(ace);
//may take time to propagate change to runtime OM
s.SetAclAndPropagate(acl);
//Get Acl on SystemInstance and remove newAdmin Ace
For each(SystemInstance si in System.GetSystemInstances( ))
{
    SPGenericAcl acl = si.GetAcl( );
    Acl.Remove(ace);
}
```

As shown above, there may be cases where automatic inheritance of an ACL from parents to children may be avoided and/or desired. Thus, it is to be appreciated that automatic inheritance may occur only in some cases, and other cases may require copying or explicit propagation to propagate the ACL down to child objects.

Figure 8:
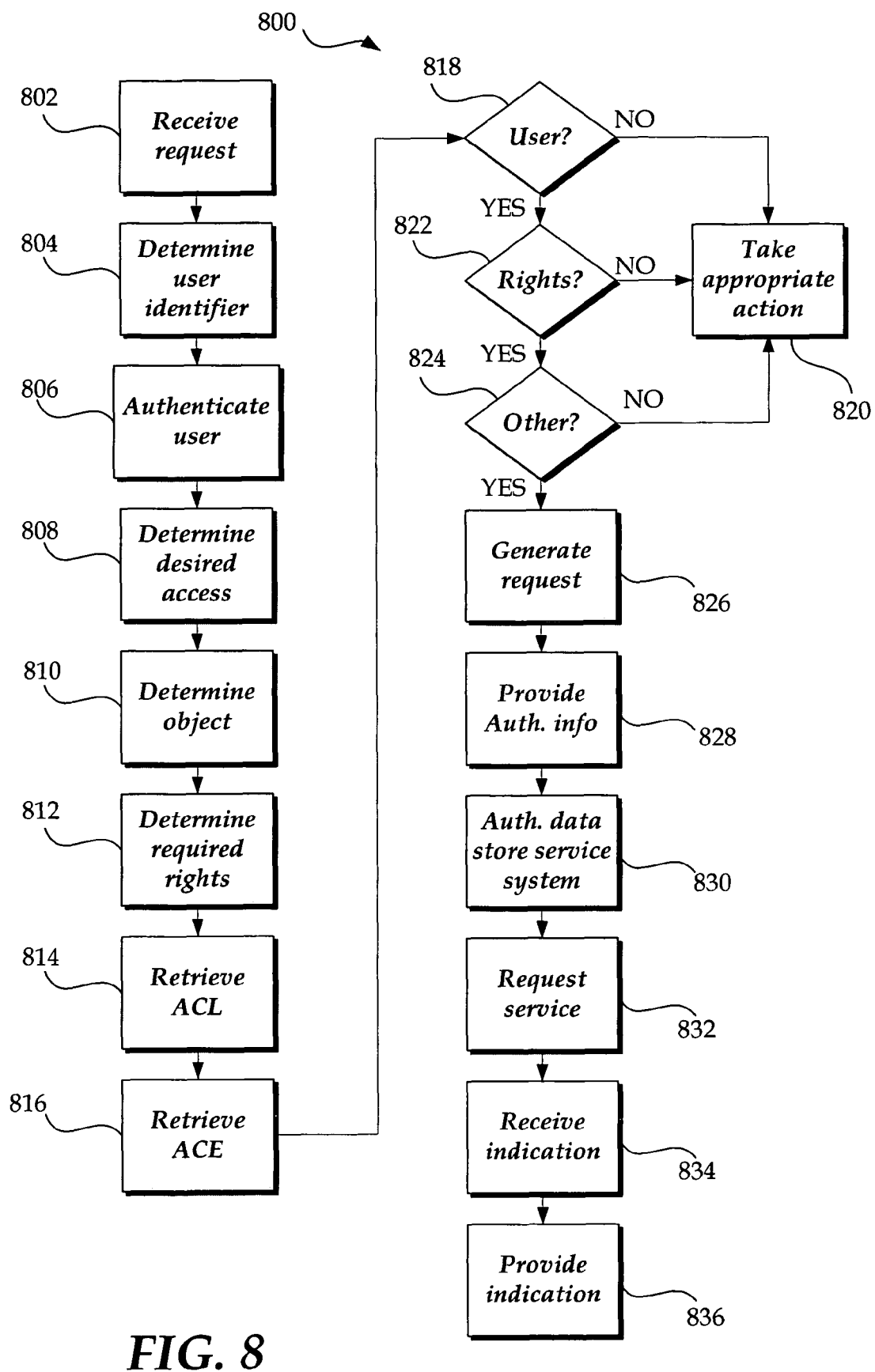
FIG. 8 is a flow chart of an example method of conducting an access check.

FIG. 8 illustrates an example method 800 of checking access to an object. As noted above, the security may be surfaced by injecting access check calls for various rights at key methods on a securable object. To check access to an object, the request may be received 802. The request or other aspects of the communication may be parsed to determine 804 the user identifier for the requesting user. It is to be appreciated, that a request may be by proxy of another user by providing a user identifier for use with authorization and/or authentication. The requesting user may be authenticated 806 in any suitable manner, i.e., the identity of the user may be verified. In some cases, the portal 170 and/or the data store service system may authenticate a user before any request is made. Thus, it is to be appreciated that any of the described steps and/or operations may be performed in any suitable order appropriate to the application and environment.

The desired services to be accessed may be determined 808 from the user request, such as user request 162 of FIG. 1. Any suitable portion of the enterprise system may determine the desired service to be accessed, such as the service system module 190 of FIG. 1 or an authorization module (not shown) of the data store services system 160. The rights required to access the desired service may be determined 810 in any suitable manner. For example, the metadata store may maintain a database of rights, such as a mapping of methods or services and the required rights, or as noted above, the required rights to access the desired service may be associated within the service itself, e.g., when implementing a method object, the method object may provide the rights required for the service.

The object to be accessed may be determined 812 from the request. For example, the service request may be to edit an object, view an object, execute an object, and the like. The desired object may be indicated in any suitable manner such as with an object name, object type, object identifier, and the like. The ACL for the desired object may be retrieved 814 and the associated ACE(s) of the ACL may be retrieved 816. As noted above in one example, the ACL may be retrieved from the object itself, if it is classified as an individually securable object, or from another object, such as a nearest individually securable object, if the object is classified as an access securable object. If the ACL is retrieved from another object, any suitable method may be used to retrieve the ACL including determining the nearest individually securable object.

The ACE may be examined 818, to determine if the user identifier is provided as an authorized user, e.g., is included in the list of user identifiers in the ACE. If not, appropriate action may be taken 820. Any number and combination of suitable appropriate actions may be taken including denying the user access to the requested service, sending a message to the user that access is denied, notifying an administrative user of denied access, logging the denied access in a log data store which may be stored in the storage 138 of FIG. 1, and the like.

If the user is listed within the ACE, the rights associated with the user identifier may be compared 822 to the required rights determined in operation 810 above. If the required rights are not associated with the user identifier, appropriate action may be taken 820. Any of the above noted appropriate actions may be taken. Moreover, if the user has some rights in the object, but not the required rights for the desired access, the data store service system may automatically choose an appropriate authorized service rather than the requested service for which the user does have associated rights. For example, a user may request to edit an object, but may not have edit rights. In response, the data store service system may check the ACE if the user identifier for the requesting user has an associated right to view the object. The associated right may then become part of the generated request of service to the application, such as request 164 described further below.

If the right or associated right(s) are indicated in the ACE, other restriction on access may be verified 824. For example, secure access to a service may be based on any context in addition to or alternative to the user identity provided above. For example, access may be based upon a verification of a feature in an application, a location within a web site, time of day and/or date of access, connection limitations on the user connection to the enterprise system, and the like. If the other restrictions are not verified, appropriate action may be taken 820.

If the user is authorized, the data store service system may generate 826 a request for the indicated service of the appropriate application. The request may be generated in any suitable manner. The request from the user, such as request 162 of FIG. 1 may be repeated or appropriately modified (e.g., formatted, extended, and the like) to send to the application 150 of FIG. 1. In another example, the data store service system may retrieve appropriate request information regarding the desired service from the metadata store 180 of FIG. 1 based on the object of the service and/or any parent objects of the service object. For example, with reference to FIG. 2, the data store service system may use the entity identifier 224, parameter list 226, or any other suitable information to generate the complex request 164 suitable for the application 150 to provide the requested service.

The application may desire to authenticate and/or authorize the data store service system. As noted above the authentication and/or authorization may be done prior to the request or as a part of executing the request. As shown in FIG. 8, the data store service system may provide to the application the appropriate account, connection, identification, credentials, and the like to the application, any of which may be retrieved from the metadata store 180 of FIG. 1. For example, the data store service system may access the application through a user account or service account with authentication and/or authorization information unique to the data store service system which may be retrieved from the metadata store 180 based upon the object identifier and the information associated with that object and any of its parent objects in the metadata store. The data store service system may be capable of signing on and being authorized by one or more security systems including server process accounts which have no credential, WINDOWS® credentials from single sign-on where the data store service system may impersonate a WINDOWS® user with its own credentials of a single sign-on (SSO) individual account and performs WINDOWS® authentication, and the like.

By centralizing user authorization, administration of the enterprise system may be simplified by maintaining only one or more user accounts with each of the applications 150 of FIG. 1, of which the data store service system maintains an account, user credentials, and the like. As noted above, the connection and/or security information may be different from the connection and/or security information of the requesting user. The data store service may maintain and retrieve the authentication, connection, authorization information in the metadata store 180, as discussed above. Moreover, if the data store service system is processing one or more requests for services from the same application, those requests may be pooled together through the same user thread, which may require only one account, connection, and the like.

The application may authenticate, verify authorization, and the like 830 in any suitable manner based on the provided information from the data store service information. To ensure that the data store service system is authorized to access the requested service, the rights associated with the data store service system may be the same as or greater than (e.g., super-user) as compared to all of the rights allowed to identified users in the object's ACL.

If the data store service system is authorized, the service may be accessed 832. When the service is accessed, an indication of success may be received 834 from the application. The indication of success may be any suitable indication of success, such as the results of an executed method, an indication that the service was successfully implemented, access to features of the application may be provided, and the like. The data store service system may provide 836 an indication of success to the requesting user in any suitable manner.

In one example, a user may desire to write code to verify if the current user using his code (e.g., one or more of applications 150) is authorized to execute a MethodInstance. The user may write:

```
Using Microsoft.Office.Server.ApplicationRegistry.MetadataModel;
//obtain a handle to the MethodInstance in some manner
MethodInstance mi = null;
//get the Acl
SPGenericAcl acl = mi.Getacl( );
//check for execute access
If (acl.AssertPermissions(BdcRightsMapper.MapToWss(BdcRights.-
Execute))
{
//allow user access to the MethodInstance object
}
Else
{
Throw new AccessDeniedException( );
}
```

Although the above example may be a bit contrived, since it is not a typical end user scenario, it illustrates example code that may be embedded in the data store service system MethodInstance.Execute( ) code to allow or deny a user access to a backend API or other application. In this example, WSS is checking where the user is that same as a user identifier listed in one of the ACEs in the ACL for the given right (Execute in the example above). However, it is to be appreciated that any suitable method or process may be used to verify authorization.

Although the examples of requests for service above of FIG. 7, and authorization for access of FIG. 8 are discussed above using the objects of the metadata store themselves, the method may be similarly implemented for a user, such as user 120 of FIG. 1 requesting services from the one or more applications 150. For example, with reference to FIG. 8, the request may be received 802 and information determined 804, 808, 810, 812, 814 with reference to the objects of application 150 stored in the metadata store. The associated ACL and ACE may be retrieved for the object associated with the requested service, and rights and user identity verified. As noted above, each object stored in the metadata store is associated with and ACL which is associated with an ACE. The data store service system may then generate 826 a request for the services in response to an authorized request from the user, and provide 828 its own authentication information to access the application 150 for the service.

Figure 14:
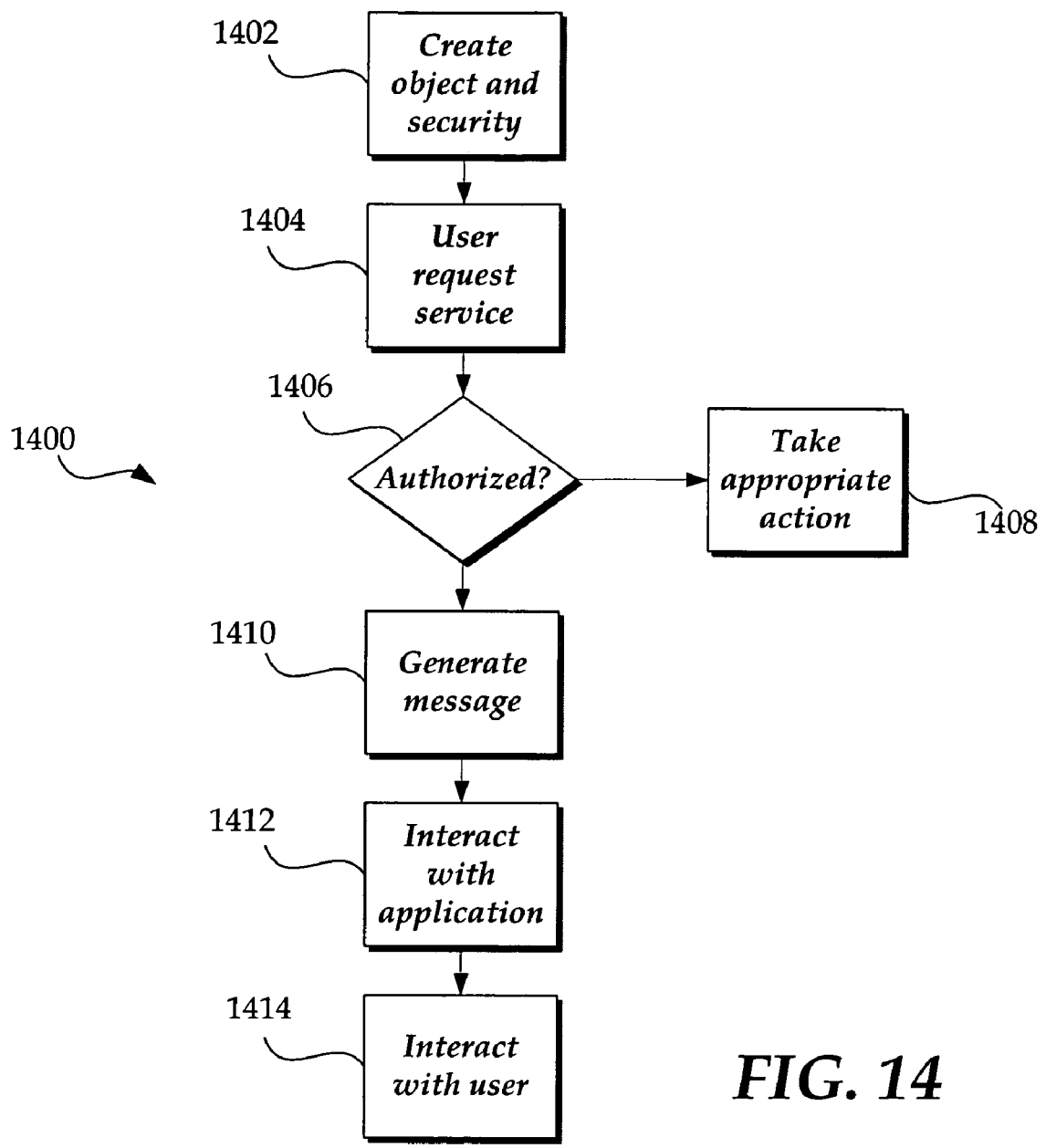
FIG. 14 is a flow chart of an example method of executing a metadata store of the enterprise environment of FIG. 1.

As shown in the examples above, the ACLs and ACEs associated with each object may be used within the creation and maintenance of other objects in the data store service system. Specifically, some types of objects of the data store service system may be used to crate, edit, and/or maintain objects of a back-end application. For example, as shown in the example method 1400 of in FIG. 14, an object may be created 1402 for one or more portions of a back-end application. As noted above, the objects may represent one or more of the hierarchy of objects such as a system, system instance, entity, method, parameter, parameter type, and the like. The objects may be created in any suitable manner, such as that described above with respect to creating an object in operations 702-706 and creating security in operations 710-714 of FIG. 7. The user device may request 1404 a service from a back end application of the enterprise system. The use request may be a simple, universal, unified and/or common request which may allow a common interface for the user across a plurality of back-end applications. As shown in the example of FIG. 1, the user request may be received by the enterprise system 130 through any suitable communication connection and which may be processed through a portal 170. With reference to FIG. 14, the data store service system may determine 1406 the appropriate objects referenced by the request. The data store service system may then determine 1407 if the user is authorized to access any one or all of the indicated objects in the requested manner. Although any suitable authorization process may be used, one suitable example is discussed above with respect to the method 800 of FIG. 8. If the user is not authorized, the data store service system may take 1408 appropriate action, which may include any one or more of terminating the request, sending an error message to the requesting user, and the like. If the user is authorized, the data store service system may generate 1410 a request that is specifically tailored for interaction with the requested service of the appropriate back-end application of the enterprise system. For example, the information maintained within the objects may include the message format, parameters needed, and the like which may be used to generate the message. The data store service system may then use the tailored request to interact 1412 with appropriate back-end application to access the service identified in the request from the user. For example, the data store service system may send the tailored request to the back-end application to access the appropriate service. The connection to the back-end application may be through a super-user account of application, and which may be pre-fabricated. The service results may be provided by the back-end application to the data store service system, which may tailor the results in accordance with the specific request from the user (e.g., data format, language, and the like), in accordance with the user preferences (e.g., user preferred data formats, languages, and the like), in accordance with user permissions (e.g., information may be culled, translated, or redacted as appropriate) which may occur if the application does not have the information fidelity required to fulfill the specific user request and/or permission, and the like the data store service system may interact 141 with the user device such as to communicate status information, results of the request, and the like.

While the preferred embodiment of the invention has been illustrated and described, it will be appreciated that various changes can be made therein without departing from the spirit and scope of the invention. For example, as noted above, the enterprise system may separate the executable functionality existing in backend applications, and the separation may be at differing levels of granularity. The separated functions of the application may be registered in a catalog in the form of metadata objects. Once the executable functionality has been registered, the authorization information for each granular functional object may be associated with authorization information. One example of an authorization right of an executable functionality may be the right to 'execute' the portions of logic associated with the executable functionality, which may access and/or modify information of the application. In addition to authorizing execution of a functionality, the metadata store may additionally or alternatively facilitate authorization of where (such as within a large portal application) the execution can be done. Like the execution authorization, the location of the execution may be authorized on a feature by feature (or object by object) basis. For example, although the above examples describe using a data store service system to access one or more applications, with objects defined as systems, entities, and the like, it is to be appreciated that objects or access requests may refer to any suitable method, object, application, and the like. For example, an application feature may allow creation of a user interface widget call Web Parts. Another feature of the application may allow creation of scoped searchable/indexable spaces. The authorization information assoicated with an object in the metadta store may allow, that within the Web Part feature, only sysem A's data may be displayed. Similarly, the metadata authorization information may allow, within the Search fature, only system B's customer entitiy data can be crawled. In this manner, an object stored in the metadata store may refer to search objects, web page connectivity and access, and the like. Similarly, although the secure data store service system is implemented above with reference to objects, such as XML objects, it is to be appreciated that lists, and other types of programming constructs may be used as suitable.

The invention claimed is:

1. A method implemented at least in part by a data store service executing on a computing device, the method comprising:
    receiving, from a first user device, a first user request for an application service of an application, and from a second user device, a second user request for the application service;
    determining a first user identifier associated with the first user device, and a second user identifier associated with the second user device;
    determining an access right for the first user device to access the application service, based on the first user identifier;
    determining a different access right for the second user device to access the application service, based on the second user identifier;
    authenticating with the application using a set of credentials associated with the data store service such that the data store service has both the access right for the first device and the different access right for the second user device;
    accessing the application service for the first user device by the data store service, provided the first user request is consistent with the access right for the first user device; and
    accessing the application service for the second user device by the data store service, provided the second user request is consistent with the access right for the second user device,
    wherein the credentials associated with the data store service are used by the data store service to access the application service for the first user device and the second user device.

2. The method of claim 1, wherein determining the access right for the first user device includes accessing an object associated with the application service, the object being stored in a data store associated with the data store service.

3. The method of claim 2, wherein accessing the object includes accessing an access control list associated with the object.

4. The method of claim 3, wherein the access control list is owned by the object.

5. The method of claim 3, wherein accessing the access control list includes accessing another object's access control list.

6. The method of claim 5, further comprising determining the another object by determining a nearest ancestor of the object owning the access control list or another access control list.

7. The method of claim 6, wherein the object is selected from a group comprising a system object, a system instance object, an entity object, a method object, a parameter object, and a parameter type object.

8. The method of claim 7, further comprising organizing the group as a hierarchy, and wherein determining the nearest ancestor of the object includes, based on the hierarchy, determining a higher level object associated with the object and owning the at least one access control list or at least one other access control list.

9. The method of claim 3, wherein accessing the object includes accessing an access control entry associated with the access control list, the access control entry including at least the first user identifier and the second user identifier.

10. The method of claim 9, wherein the access right for the first user device and the different access right for the second user device are selected from a group comprising a right to edit, a right to view, and a right to execute.

11. One or more computer readable storage media having stored thereon a data structure comprising:
    a) a first data field containing data representing an object identifier, the object identifier indicating an available service of an application and a security classification for accessing the available service, wherein the security classification identifies a required level of access rights to access the available service that is greater than a level of access rights of an authorized user of the application;
    b) a second data field, associated with the first data field, containing data representing an access control list identifier;
    c) a third data field, associated with the second data field, containing data representing an access control entry identifier;
    d) a fourth data field, associated with the third data field, containing data representing a user identifier associated with the authorized user of the application; and
    e) a fifth data field, associated with the third data field, containing data representing a right identifier indicating that the authorized user is permitted to access the available service via a data store service having the required level of access rights to access the available service.

12. The one or more computer readable storage media of claim 11, wherein the access control list identifier references an access control list application program interface for checking access rights of users requesting access to the available service or another service of the application.

13. The one or more computer readable storage media of claim 11, wherein the access control entry identifier references an access control entry application program interface for verifying access rights based on the fourth and fifth data fields.

14. The one or more computer readable storage media of claim 11, wherein the object identifier identifies an object having a type selected from a group comprising a system object, a system instance object, an entity object, a method object, a parameter object, and a parameter type object.

15. One or more computer readable storage media containing computer readable instructions that, when implemented, perform a method comprising:
associating a service identifier with a first authorized user identifier and a first access right indicator of the first authorized user identifier, wherein the service identifier is associated with a service of an application;
associating the service identifier with a second authorized user identifier and a second access right indicator of the second authorized user identifier, the first access right indicator and the second access right indicator indicating different access rights for the service;
receiving a first request for the service from a first user device;
verifying that a first user identifier associated with the first user device matches the first authorized user identifier;
receiving a second request for the service from a second user device;
verifying that a second user identifier associated with the second user device matches the second authorized user identifier;
determining, based on the first access right indicator, whether accessing the service is permitted for the first user device;
determining, based on the second access right indicator, whether accessing the service is permitted for the second user device;
providing credentials to access an account associated with the application, wherein the credentials are associated with an entity other than the first user device and the second user device; and
using the account to access the service for both the first user device and the second user device by the entity, provided both the first user device and the second user device are permitted to access the service.

16. The one or more computer readable storage media of claim 15, further comprising:
associating the service identifier with an access control list;
associating the access control list with an access control entry; and
associating the access control entry with the first authorized user identifier and the first access right indicator.

17. The one or more computer readable storage media of claim 16, wherein associating the service identifier with the access control list includes creating a service object containing the access control list.

18. The one or more computer readable storage media of claim 16, wherein associating the service identifier with the access control list includes associating the service identifier with an application program interface for discovering a nearest ancestor object of the service identifier that contains the access control list.

19. The one or more computer readable storage media of claim 18, wherein discovering the nearest ancestor object includes walking up a predetermined object hierarchy associated with the service identifier and determining a nearest higher level object containing the access control list or another access control list.

20. The one or more computer readable storage media of claim 15, further comprising associating the first authorized user identifier and the first access right indicator with a child service indicator associated with the service indicator in accordance with a service hierarchy.

21. The one or more computer readable storage media according to claim 15, wherein the account used to access the service has at least one access right that is not indicated by the first access right indicator and the second access right indicator.

22. The one or more computer readable storage media according to claim 15, wherein the entity comprises a data store service, the method further comprising:
receiving, by the data store service, results from the service for the first user device;
redacting, by the data store service, the results in accordance with user permissions for the first user device; and
providing the redacted results to the first user device.

* * * * *